US010853681B2

(12) United States Patent
Torii et al.

(10) Patent No.: US 10,853,681 B2
(45) Date of Patent: Dec. 1, 2020

(54) INFORMATION PROCESSING DEVICE, INFORMATION PROCESSING METHOD, AND PROGRAM

(71) Applicant: SONY CORPORATION, Tokyo (JP)

(72) Inventors: Kuniaki Torii, Kanagawa (JP); Ryo Fukazawa, Kanagawa (JP); Takahiro Okayama, Tokyo (JP); Kazuomi Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 63 days.

(21) Appl. No.: 16/086,739

(22) PCT Filed: Jan. 24, 2017

(86) PCT No.: PCT/JP2017/002223
§ 371 (c)(1),
(2) Date: Sep. 20, 2018

(87) PCT Pub. No.: WO2017/169001
PCT Pub. Date: Oct. 5, 2017

(65) Prior Publication Data
US 2019/0114502 A1   Apr. 18, 2019

(30) Foreign Application Priority Data
Mar. 29, 2016  (JP) .................. 2016-066631

(51) Int. Cl.
*G06K 9/34* (2006.01)
*G02B 27/02* (2006.01)
(Continued)

(52) U.S. Cl.
CPC ......... *G06K 9/342* (2013.01); *G02B 27/0172* (2013.01); *G02B 27/02* (2013.01);
(Continued)

(58) Field of Classification Search
CPC ...... G06K 9/342; G06K 9/2054; G02B 27/02; G02B 27/0172; H04N 5/64; G06T 11/00; G06T 7/11; G06F 9/542
See application file for complete search history.

(56) References Cited

U.S. PATENT DOCUMENTS

2005/0046725 A1\*  3/2005  Sasagawa ............ H04N 7/0122
                                                      348/333.01
2014/0375683 A1   12/2014  Salter et al.
(Continued)

FOREIGN PATENT DOCUMENTS

CN     105103198 A    11/2015
CN     105378625 A     3/2016
(Continued)

OTHER PUBLICATIONS

Extended European Search Report of EP Patent Application No. 17773551.1, dated Jan. 15, 2019, 8 pages.
(Continued)

*Primary Examiner* — Chuong A Ngo
(74) *Attorney, Agent, or Firm* — Chip Law Group

(57) ABSTRACT

[Object] To provide an information processing device, an information processing method, and a program. [Solution] An information processing device including: a notification control unit configured to cause a user to be notified of occurrence of cutting-off in a display region of a transmissive display unit on a basis of detection of the occurrence of the cutting-off in which a whole of a display object in which at least a partial region is displayed is not contained in the display region.

12 Claims, 17 Drawing Sheets

(51) Int. Cl.
   *H04N 5/64*     (2006.01)
   *G06T 11/00*    (2006.01)
   *G06T 7/11*     (2017.01)
   *G02B 27/01*    (2006.01)
   *G06F 9/54*     (2006.01)
   *G06K 9/20*     (2006.01)

(52) U.S. Cl.
   CPC .......... *G06F 9/542* (2013.01); *G06K 9/2054* (2013.01); *G06T 7/11* (2017.01); *G06T 11/00* (2013.01); *H04N 5/64* (2013.01)

(56) References Cited

U.S. PATENT DOCUMENTS

| | | |
|---|---|---|
| 2015/0325054 A1 | 11/2015 | Salter et al. |
| 2016/0055676 A1 | 2/2016 | Kasahara et al. |
| 2016/0159280 A1 | 6/2016 | Takazawa et al. |
| 2016/0286080 A1* | 9/2016 | Hayashi .................. G06T 7/194 |
| 2017/0069143 A1 | 3/2017 | Salter et al. |

FOREIGN PATENT DOCUMENTS

| | | |
|---|---|---|
| DE | 112014003145 T5 | 3/2016 |
| EP | 2983138 A1 | 2/2016 |
| EP | 3014409 A1 | 5/2016 |
| JP | 2007-264324 A | 10/2007 |
| JP | 2015-228050 A | 12/2015 |
| JP | 5983547 B2 | 8/2016 |
| JP | 2007-264324 A | 10/2017 |
| JP | 6304241 B2 | 4/2018 |
| KR | 10-2016-0023888 A | 3/2016 |
| WO | 2014/162825 A1 | 10/2014 |
| WO | 2014/209770 A1 | 12/2014 |
| WO | 2015/001796 A1 | 1/2015 |

OTHER PUBLICATIONS

International Search Report and Written Opinion of PCT Application No. PCT/JP2017/002223, dated Mar. 14, 2017, 06 pages of ISRWO.

Office Action for JP Patent Application No. 2018-508439, dated May 26, 2020, 3 pages of Office Action and 3 pages of English Translation.

* cited by examiner

INFORMATION PROCESSING DEVICE, INFORMATION PROCESSING METHOD, AND PROGRAM

CROSS REFERENCE TO RELATED APPLICATIONS

This application is a U.S. National Phase of International Patent Application No. PCT/JP2017/002223 filed on Jan. 24, 2017, which claims priority benefit of Japanese Patent Application No. JP 2016-066631 filed in the Japan Patent Office on Mar. 29, 2016. Each of the above-referenced applications is hereby incorporated herein by reference in its entirety.

TECHNICAL FIELD

The present disclosure relates to an information processing device, an information processing method, and a program.

BACKGROUND ART

Devices including transmissive display units (see-through displays) are used (for example, see Patent Literatures 1 and 2). By using the transmissive display units, for example, it is possible to display virtual objects superimposed on real spaces as backgrounds.

CITATION LIST

Patent Literature

Patent Literature 1: JP 2007-065080A
Patent Literature 2: JP 2010-145859A

DISCLOSURE OF INVENTION

Technical Problem

However, depending on display sizes or display positions of objects to be displayed (display objects), cutting-off in which a whole of the display objects are not contained in display regions of display units occurs in some cases. In a case in which cutting-off occurs in transmissive display units, for example, the display objects have appearances in which the display objects are cut off halfway, and thus there is concern that users may feel a sense of discomfort.

Accordingly, the present disclosure proposes a novel and improved information processing device, a novel and improved information processing method, and a novel and improved program capable of reducing a sense of discomfort of a user due to occurrence of cutting-off.

Solution to Problem

According to the present disclosure, there is provided an information processing device including: a notification control unit configured to cause a user to be notified of occurrence of cutting-off in a display region of a transmissive display unit on a basis of detection of the occurrence of the cutting-off in which a whole of a display object in which at least a partial region is displayed is not contained in the display region.

In addition, according to the present disclosure, there is provided an information processing method including: causing, by a processor, a user to be notified of occurrence of cutting-off in a display region of a transmissive display unit on a basis of detection of the occurrence of the cutting-off in which a whole of a display object in which at least a partial region is displayed is not contained in the display region.

In addition, according to the present disclosure, a program in which a processor causes a computer system to realize: a notification control function of causing a user to be notified of occurrence of cutting-off in a display region of a transmissive display unit on a basis of detection of the occurrence of the cutting-off in which a whole of a display object in which at least a partial region is displayed is not contained in the display region.

Advantageous Effects of Invention

According to the present disclosure described above, it is possible to reduce a sense of discomfort of a user due to occurrence of cutting-off.

MODE(S) FOR CARRYING OUT THE INVENTION

Figure 1:
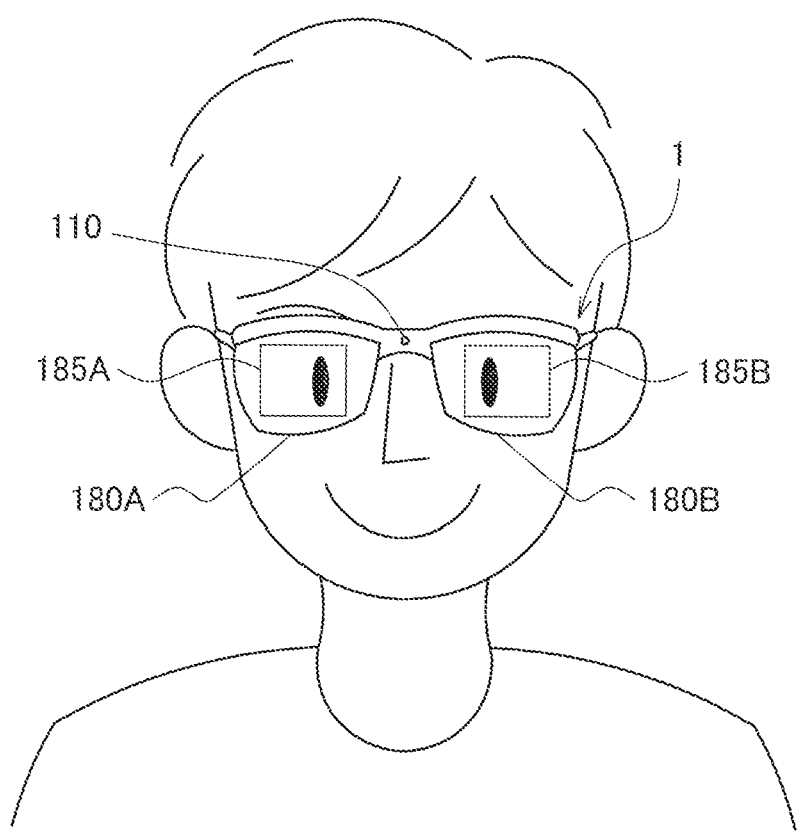
FIG. 1 is an explanatory diagram illustrating the outer appearance of an information processing device according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that the description will be made in the following order.

«1. First embodiment»
<1-1. Overview of first embodiment>
<1-2. Configuration of first embodiment>
<1-3. Operation of first embodiment>
<1-4. Advantageous effects of first embodiment>
«2. Second embodiment»
<2-1. Overview of second embodiment>
<2-2. Configuration of second embodiment>
<2-3. Operation of second embodiment>
<2-4. Advantageous effects of second embodiment>
«3. Third Embodiment»
<3-1. Overview of third embodiment>
<3-2. Configuration of third embodiment>
<3-3. Operation of third embodiment>
<3-4. Modification examples of third embodiment>
<3-5. Advantageous effects of third embodiment>
«4. Hardware configuration example»
«5. Conclusion»
«1. First Embodiment»
<1-1. Overview of First Embodiment>

First, an overview of an information processing device according to a first embodiment of the present disclosure will be described with reference to FIG. 1. FIG. 1 is an explanatory diagram illustrating the outer appearance of the information processing device according to the first embodiment of the present disclosure.

As illustrated in FIG. 1, an information processing device 1-1 according to the first embodiment of the present disclosure is a glasses type display device that includes an imaging unit 110 and display units 180A and 180B.

The information processing device 1-1 displays a display object on display regions 185A and 185B of the display units 180A and 180B on the basis of a captured image obtained by causing the imaging unit 110 to image the real space. The display object according to the embodiment may be, for example, information which is presented to a user to correspond to the real space (an image, descriptive text of an object in the real space, a navigation icon, a warning effect, or the like) or may be a 3D object such as a dynamically moving game character or a fixed building. Further examples of the display object according to the embodiment will be described later.

The display units 180A and 180B have the display regions 185A and 185B and the display object is displayed in the display regions 185A and 185B. The display units 180A and 180B are transmissive display units (which are examples of see-through displays). Even in a case in which the user wears the information processing device 1-1, the user can view the real space along with an image displayed in the display regions 185A and 185B. For example, the display units 180A and 180B may have a configuration in which light passes through the display regions 185A and 185B or may have a configuration in which light further passes through regions other than the display regions 185A and 185B. Note that in the case of a 3D model or the like in which the display object has a depth, the display units 180A and 180B display images for the right and left eyes, respectively, so that the user can perceive binocular parallax.

Figure 2:
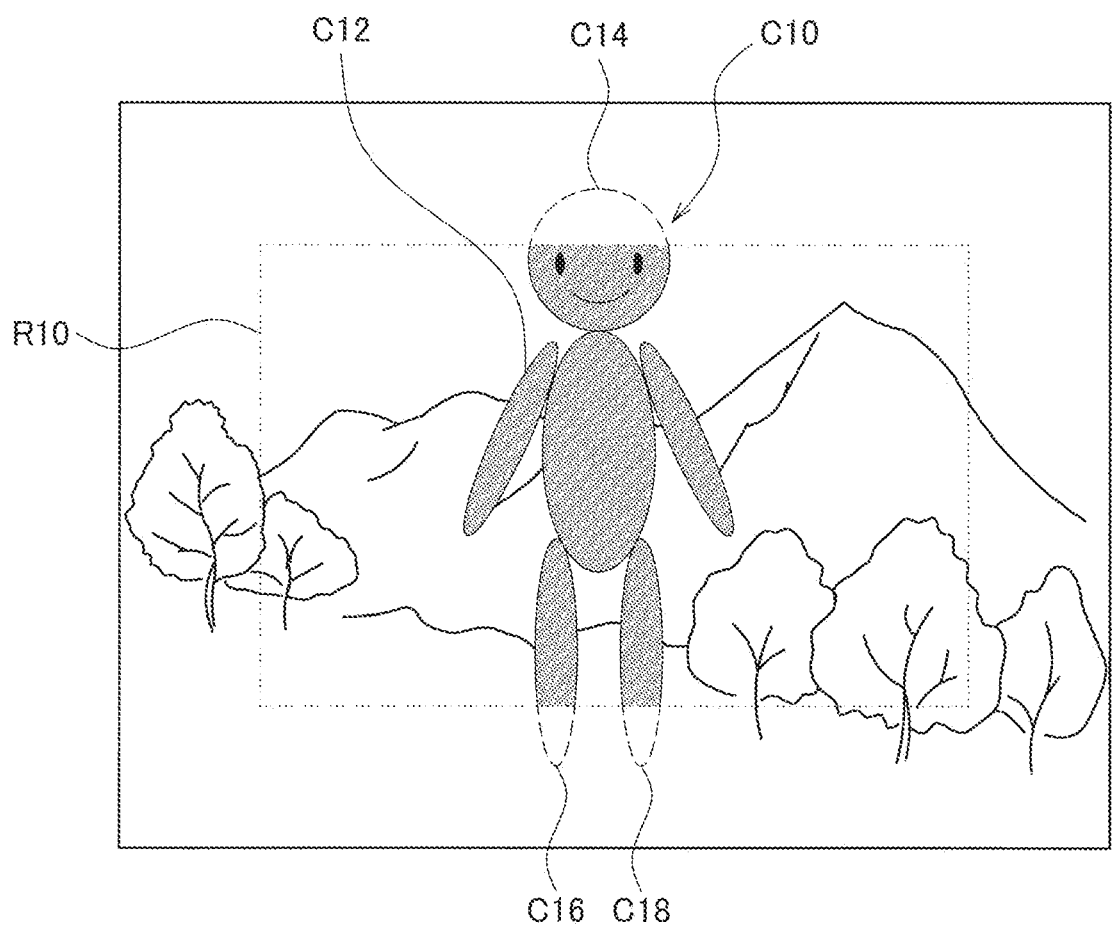
FIG. 2 is an explanatory diagram illustrating an example of an angle of view of a user at the time of occurrence of cutting-off according to the embodiment.

Depending on a display size of the display object, cutting-off occurs. Cutting-off in the present disclosure is a state in which a whole of the display object in which at least partial regions are displayed is not contained in, for example, display regions of the transmissive display units (in the embodiment, the display regions 185A and 185B of the display units 180A and 180B). FIG. 2 is an explanatory diagram illustrating an example of an angle of view of the user at the time of occurrence of cutting-off. A boundary R10 illustrated in FIG. 2 indicates a boundary (outer edge) of the display regions 185A and 185B in the display units 180A and 180B. Since the display units 180A and 180B have high transparency, it is difficult for the user to recognize the boundary R10.

A display object C10 illustrated in FIG. 2 includes a visible region C12 which is contained in an inner portion (a display region) of the boundary R10 and is displayed and invisible regions C14, C16, and C18 which are not contained in the display region and therefore are not displayed. That is, since a partial region (the visible region C12) of the display object C10 is displayed in the display regions 185A and 185B, but a whole of the display object C10 is not contained in the display regions 185A and 185B, cutting-off occurs.

As illustrated in FIG. 2, when cutting-off occurs, the display object C10 is cut near the boundary R10 to be displayed. However, as described above, it is difficult for the user to recognize the boundary R10. Therefore, when cutting-off occurs, the user may see the display object C10 which seems to be cut halfway in a spot in which there is no display object C10, and thus there is concern that the user may feel a sense of discomfort.

In addition, for example, in a case in which a display object that can have different meanings between a case in which a whole of the display object is seen and a case in which a part of the display object is seen is displayed, such as display of text, there is concern that the user may not correctly understand the meaning of the display object due to cutting-off.

Accordingly, the embodiment has been created in view of the foregoing circumstances. According to the embodiment, by displaying an auxiliary UI that helps the user recognize whether cutting-off occurs, it is possible to reduce a sense of discomfort of the user caused due to cutting-off. Hereinafter, a configuration of the embodiment for such an advantageous effect will be described in detail.

<1-2. Configuration of First Embodiment>

The overview of the information processing device 1-1 according to the first embodiment of the present disclosure has been described. Next, the configuration of the information processing device 1-1 according to the embodiment will be described with reference to FIG. 3.

Figure 3:
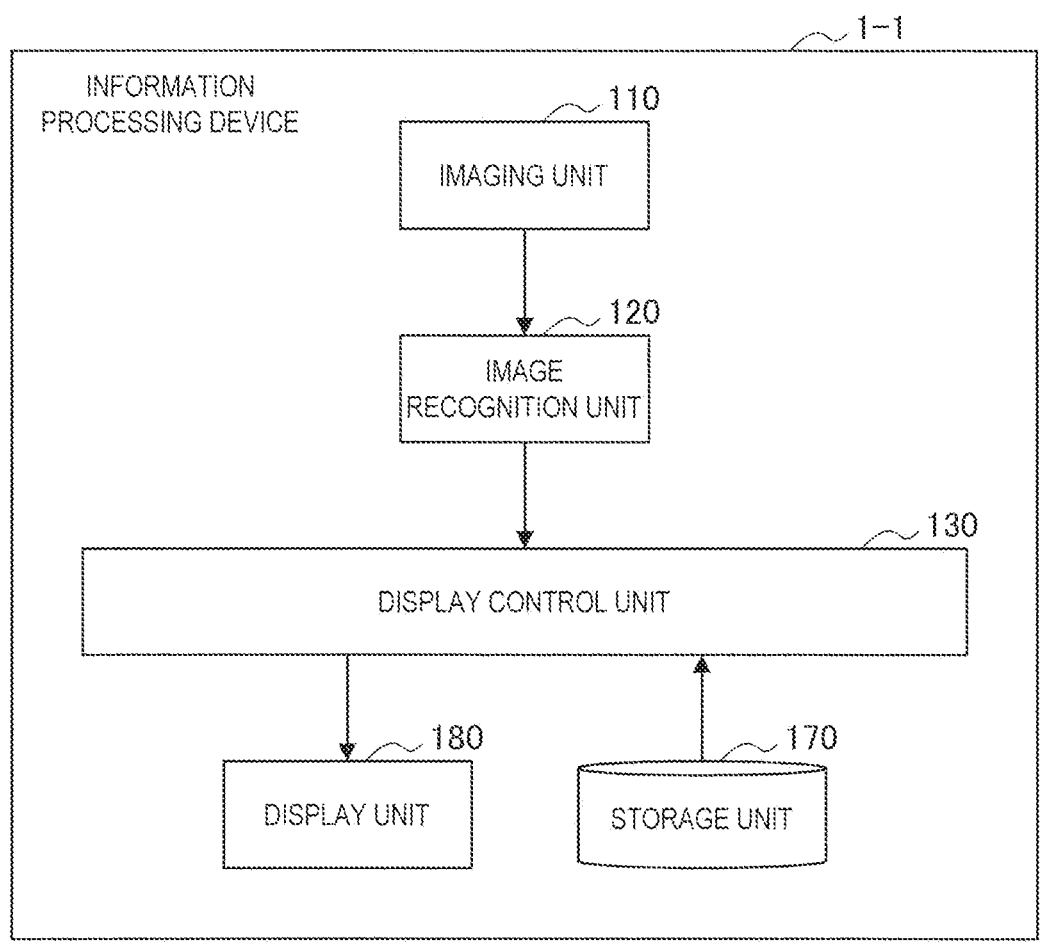
FIG. 3 is an explanatory diagram illustrating an example of a configuration of the information processing device according to the embodiment.

FIG. 3 is an explanatory diagram illustrating an example of a configuration of the information processing device 1-1 according to the embodiment. As illustrated in FIG. 3, the information processing device 1-1 according to the embodiment includes an imaging unit 110, an image recognition unit 120, a display control unit 130, a storage unit 170, and a display unit 180.

(Imaging Unit)

The imaging unit 110 is a camera module that acquires an image. The imaging unit 110 acquires a captured image by imaging the real space using an image sensor such as a charge coupled device (CCD) or a complementary metal oxide semiconductor (CMOS). For example, the imaging unit 110 according to the embodiment may have the same angle of field as an angle of view of the user wearing the information processing device 1-1 or a range imaged by the imaging unit 110 may be seen as an angle of view of the user. Note that a captured image acquired by the imaging unit 110 is supplied to the image recognition unit 120.

Also, the imaging unit 110 may be a stereo camera that includes two image sensors and simultaneously acquires two images. In this case, the two image sensors are arranged horizontally. Thus, by analyzing a plurality of images acquired by the image recognition unit 120 to be described below through a stereo matching method or the like, it is possible to acquire 3-dimensional shape information (depth information) of the real space.

(Image Recognition Unit)

The image recognition unit 120 analyzes a captured image acquired by the imaging unit 110 and recognizes a 3-dimensional shape of the real space or an object, a marker, or the like in the real space. For example, the image recognition unit 120 may recognize the 3-dimensional shape of the real space and acquire the 3-dimensional shape information by performing a stereo matching method on a plurality of simultaneously acquired images or performing a structure from motion (SfM) method or the like on a plurality of chronologically acquired images. Also, the image recognition unit 120 may recognize an object, a marker, or the like in the real space and acquire information regarding the object, the marker, or the like by performing matching between feature point information prepared in advance and feature point information detected from the captured images. The foregoing information acquired by the image recognition unit 120 is supplied to the display control unit 130.

(Display Control Unit)

The display control unit 130 controls display of the display unit 180. For example, the display control unit 130 causes the transmissive display unit 180 to display a display object on the basis of, for example, object information, 3-dimensional information of the real space supplied from the image recognition unit 120, or the like.

For example, the display control unit 130 may display a display object on the basis of object information of an object detected from a captured image (information such as a kind, a position, or the like of the object). For example, the display control unit 130 may acquire text data for describing the object on the basis of the object information and may display a result (text display) obtained by rendering the text data as a display object using a predetermined font.

Note that a display object or information (for example, text data or the like) for displaying a display object may be stored in the storage unit 170. Also, the display control unit 130 may directly acquire a display object from the storage unit 170 or may generate (for example, render) a display object on the basis of information stored in the storage unit 170 and display the display object.

Also, the display control unit 130 specifies a position of a display object in a space (a position in the real space or a virtual space).

The position in the space may be specified, for example, on the basis of the position of an object (a real object) in the real space, such as an augmented reality (AR) marker or a predetermined object. Also, in a case in which a display object such as a game character which can move freely is not fixed by a real object, the position in the space may be dynamically set (specified) by an application.

Note that the position of the display object in the space may be expressed as coordinate values in a coordinate system set in the real space or a virtual space (a 3-dimensional virtual space). Also, in this case, a position of the user may also be set in the coordinate system in which the position of the display object in the space is expressed in this way. For example, the position of the user may be set as coordinate values of the information processing device 1-1 in the coordinate system set in the real space. Also, in a case in which the position in the space is expressed as coordinate values in the coordinate system set in the virtual space, the position of the user may be expressed as coordinate values of a virtual viewpoint for rendering a display object in the virtual space.

Also, the display control unit 130 performs rendering at a predetermined angle of field from the position of the user and displays the display object in the display region of the display unit 180. Here, for example, a display size of the display object in the display region is decided in accordance with the position of the user and the position of the display object in the space.

For example, in a case in which the position of the space is specified in accordance with a real object, display control may be performed such that the display size increases when the user is closer to the real object and the display size decreases when the user is further from the real object. In this configuration, the user can perceive the display object in association with a real object and can feel the display object more realistically.

Also, a display position of the display object in the display region may also be decided in accordance with the position of the user and the position of the display object in the space.

As described above, the display size and the display position are decided on the basis of the position of the user and the position of the display object in the space. Therefore, depending on the position of the user and the position of the display object in the space, cutting-off occurs in some cases. For example, in a case in which a height in the display size is greater than a height of the display region, cutting-off occurs at least in a height direction.

Figure 4:
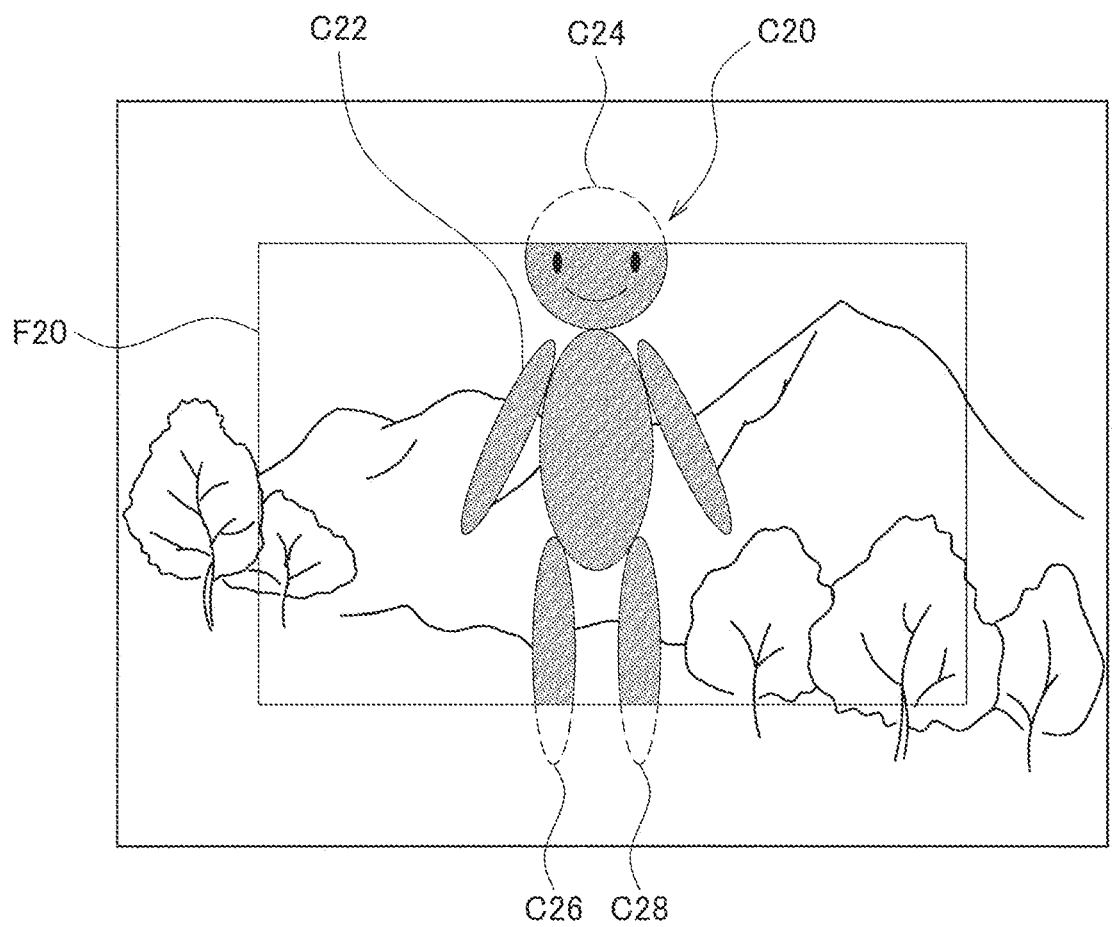
FIG. 4 is an explanatory diagram illustrating an example of a frame displayed by a display control unit according to the embodiment.

Also, the display control unit 130 displays an auxiliary user interface (UI) for helping the user recognize whether cutting-off occurs (occurrence or non-occurrence of cutting-off). For example, the display control unit 130 may display a frame to be displayed as the auxiliary UI in a peripheral portion of the display region of the display unit 180. FIG. 4 is an explanatory diagram illustrating an example of a frame displayed by the display control unit 130.

A frame F20 illustrated in FIG. 4 is a frame which is displayed as the auxiliary UI by the display control unit 130 in the outer edge in the peripheral portion of the display region of the display unit 180. Also, cutting-off occurs even in FIG. 4. A display object C20 illustrated in FIG. 4 includes a visible region C22 and invisible regions C24, C26, and C28, like an example of the display object C10 described with reference to FIG. 2.

In FIG. 4, however, the frame F20 is displayed and the user feels a sense just as the user views a space in which the display object C20 is displayed through the frame F20. Therefore, even in a case in which cutting-off occurs, a sense of discomfort is reduced. Also, since the user easily recognizes the occurrence of the cutting-off because of the frame F20, the user can understand that a whole of the display object C20 is not displayed and there is also information in a region other than the display region. Thus, the user is prevented from misunderstanding a meaning only in the visible region C22. Further, because of the frame F20, the user can easily understand a spot in which the display object is fragmented due to the cutting-off and the reason for the cutting-off (for example, the display size is considerably large at the current position of the user, or the like). Therefore, for example, the user can move to resolve the cutting-off.

Note that the auxiliary UI displayed by the display control unit 130 is not limited to the example described above with reference to FIG. 4. For example, the frame displayed by the display control unit 130 may be a dashed line or a dotted line rather than a solid line or may be a light color, luminance, or a thin line in a range which can be viewed by the user. Also, for example, the auxiliary UI may be displayed to blink by the display control unit 130 rather than being displayed constantly. In this configuration, a sense of vision of the user may not be hindered as much as possible and occurrence of cutting-off can be easily recognized. Also, the display control unit 130 may enable the user to easily recognize occurrence of cutting-off by displaying an auxiliary UI in which a whole of the display region or a region except for a region in which the display object is displayed in the display region is lightly colored.

(Storage Unit)

The storage unit 170 stores information regarding a display object. The information regarding the display object stored in the storage unit 170 may include, for example, rendering information of a 3D model and the like, an image, display information of an effect, display information of marking, display information of a silhouette, and text, and the like.

For example, the display object according to the embodiment may be an effect display or the like that has an effect of emphasizing or presenting a motion of a real object or another display object (hereinafter collectively referred to as an object in some cases).

Also, the display object according to the embodiment may be a marking display associated with an object. Also, the display object according to the embodiment may be a navigation display indicating a path or a sample of a behavior in the real space or a virtual space. Also, the display object according to the embodiment may be an object indicating a silhouette superimposed on an object or a sensing result of the object.

Also, the display object according to the embodiment may be a 3D object or an image indicating a game character, an item, a building, or the like in a game. Also, the display object may be a 3D object or an image indicating a previous history (for example, a so-called ghost car in a racing game) in navigation or a display object game according to the embodiment.

Also, the display object according to the embodiment may be an object suggesting an object such as a nearby person, a manual regarding the object, text indicating property information (a name, a speed, an attribute, or the like), or the like. Note that a display position of this display object may be a position superimposed on the object or may be a position near the object which is not superimposed on the object.

Also, the display object according to the embodiment may be an object or the like of a virtual advertisement or a banner for which any position of a space is set as a display position.

(Display Unit)

Figure 5:
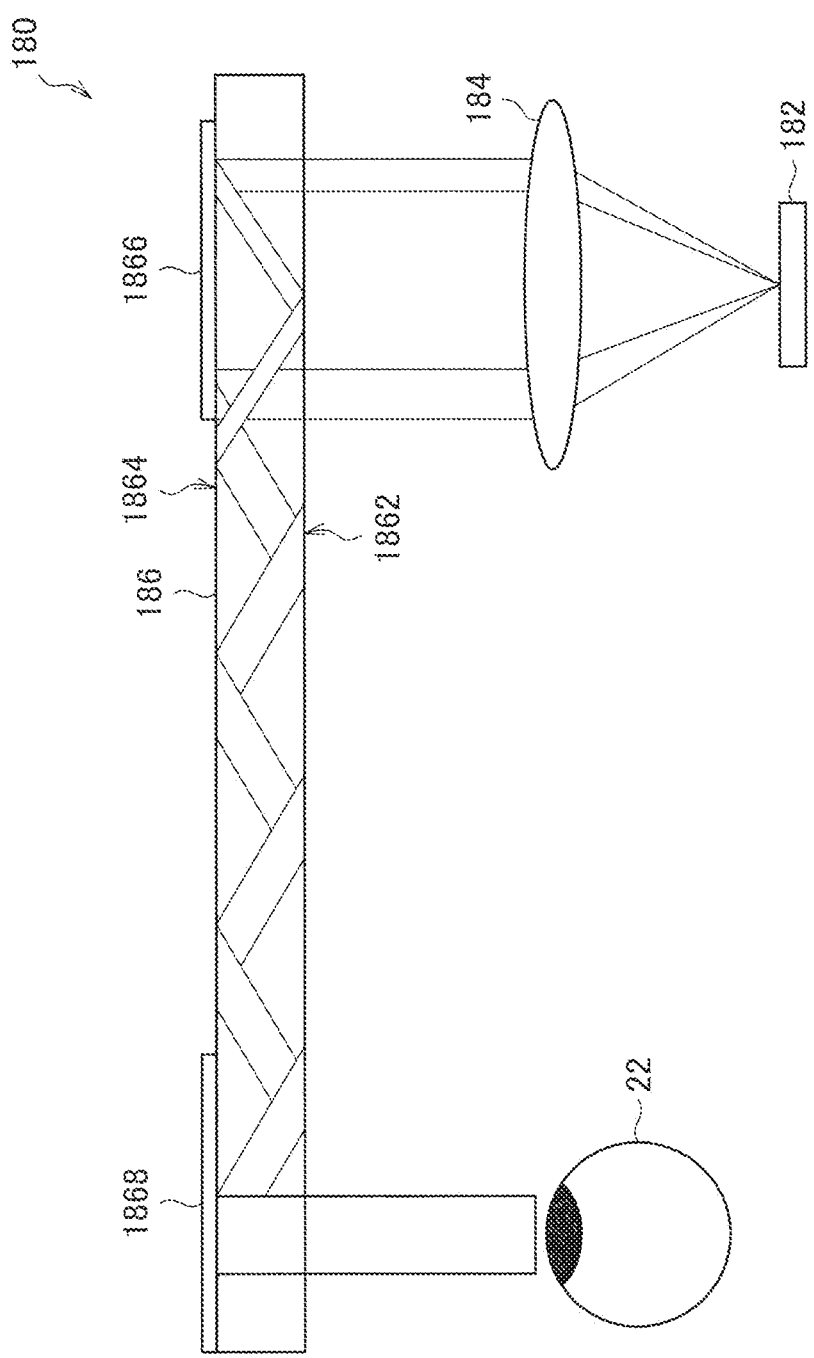
FIG. 5 is an explanatory diagram illustrating an example of a configuration of a display unit according to the embodiment.

The display unit 180 is a transmissive (see-through) display (display unit) that displays a display object. Hereinafter, an example of a configuration of the display unit 180 will be described with reference to FIG. 5. FIG. 5 is an explanatory diagram illustrating the example of the configuration of the display unit 180.

As illustrated in FIG. 5, the display unit 180 according to the embodiment includes a reflective spatial light modulation unit 182, a collimating optical system 184 including a finder lens and the like, and a hologram type light-guiding plate (a wave guide) 186. The light-guiding plate 186 includes optical surfaces 1862 and 1864 that face each other in a depth direction of a pupil 22 of the user and reflective volume hologram gratings 1866 and 1868 that are installed on the optical surface 1864 and have a uniform interference fringe pitch of a hologram surface regardless of a position.

As illustrated in FIG. 5, light emitted when the spatial light modulation unit 182 modulates the image is set as a parallel light flux group in which angles of field are mutually different by the collimating optical system 184 to be incident on the light-guiding plate 186 from the optical surface 1862. The light incident on the light-guiding plate 186 is incident on the reflective volume hologram grating 1866 and is diffracted and reflected by the reflective volume hologram grating 1866. The light diffracted and reflected by the reflective volume hologram grating 1866 is guided while being repeatedly totally reflected between the optical surfaces 1862 and 1864 inside the light-guiding plate 186 to travel toward the reflective volume hologram grating 1868. The light incident on the reflective volume hologram grating 1868 deviates from a total reflection condition by diffractive reflection, is emitted from the light-guiding plate 186, and is incident on the pupil 22 of the user.

Note that the display regions 185A and 185B of the display unit 180 described with reference to FIG. 1 are equivalent to a region of the reflective volume hologram grating 1868 in the light-guiding plate 186 illustrated in FIG. 5.

Note that the configuration of the transmissive display unit 180 is not limited to the foregoing example. For example, the display unit 180 may have a configuration in which a reflected image is displayed using a half mirror or the like or may have a configuration in which an image is displayed by radiating light to retinas of the user.

<1-3. Operation of First Embodiment>

Figure 6:
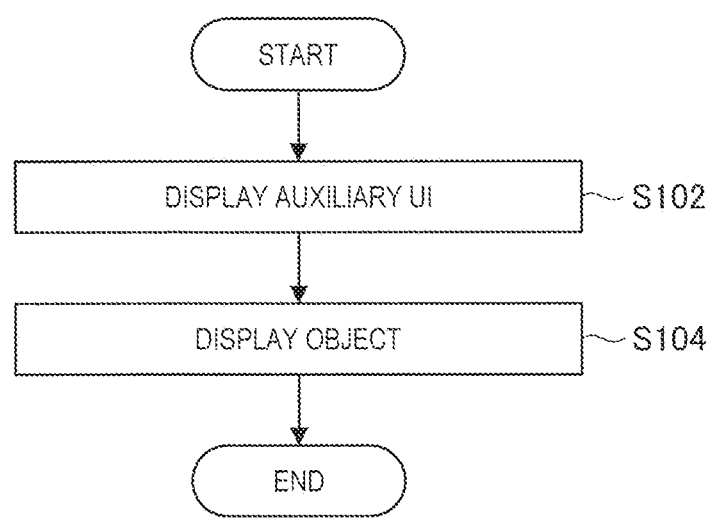
FIG. 6 is an explanatory diagram illustrating an example of an operation of the information processing device according to the embodiment.

The example of the configuration of the information processing device 1-1 according to the first embodiment of the present disclosure has been described. Next, an example of an operation of the information processing device 1-1 according to the embodiment will be described with reference to FIG. 6 particularly focusing on an operation of display control by the display control unit 130. FIG. 6 is a flowchart for describing an example of an operation of the information processing device 1-1 according to the embodiment.

First, the display control unit 130 displays the frame (the auxiliary UI) to be displayed in the outer edge of the display region of the display unit 180 (S102). Subsequently, the display control unit 130 displays the display object (S104).

Note that the above-described operation is exemplary and an operation related to the display control of the display control unit 130 according to the embodiment is not limited to the foregoing operation. For example, the display control unit 130 may cause display of a display object to be updated as required in accordance with a position or the like of the user in a current state by repeatedly performing the foregoing series of processes (steps S102 to S104) or the object display process (step S104).

<1-4. Advantageous Effects of First Embodiment>

The first embodiment of the present disclosure has been described above. According to the embodiment, by displaying the auxiliary UI (for example, the frame of the outer edge of the display region or the like) for helping the user recognize whether cutting-off occurs, it is possible to reduce a sense of discomfort of the user at the time of occurrence of the cutting-off. Also, when the user recognizes occurrence of cutting-off, the user can understand that a whole of the display object is not displayed and there is information in a region other the display region. Therefore, the user is prevented from misunderstanding a meaning only in a part of the display object displayed in the display region. Further, the user can easily understand a spot in which the display object is fragmented due to the cutting-off and the reason for the cutting-off (for example, the display size is considerably large at the current position of the user, or the like). Therefore, for example, the user can move or the like to see the information which is outside of the display region.

«2. Second Embodiment»

<2-1. Overview of Second Embodiment>

In the above-described first embodiment, the example in which the auxiliary UI for helping a user recognize whether cutting-off occurs is displayed has been described. On the other hand, hereinafter, an example in which the user easily recognizes whether cutting-off occurs by performing a predetermined process on a display object will be described in a second embodiment.

In an information processing device according to the second embodiment, by performing display control such that the predetermined process is performed on a region of a display object displayed in a peripheral portion of a display region, it is possible to reduce a sense of discomfort of the user due to occurrence of cutting-off. Hereinafter, a configuration and an operation of the second embodiment in which the foregoing advantageous effects are obtained will be sequentially described in detail.

<2-2. Configuration of Second Embodiment>

The information processing device according to the second embodiment of the present disclosure is a glasses type display device that includes a transmissive display unit like the information processing device 1-1 according to the first embodiment described with reference to FIGS. 1 and 3. Since the information processing device according to the embodiment has the configuration similar to a part of the information processing device 1-1 according to the first embodiment, the description thereof will be appropriately omitted.

The outer appearance of the information processing device according to the embodiment is the same as the outer appearance of the information processing device 1 according to the first embodiment described with reference to FIG. 1. Also, the information processing device according to the embodiment includes the imaging unit 110, the image recognition unit 120, the display control unit 130, the storage unit 170, and the display unit 180, like the information processing device 1-1 according to the first embodiment illustrated in FIG. 3. Since the configurations of the imaging unit 110, the image recognition unit 120, the storage unit 170, and the display unit 180 according to the embodiment are substantially the same as the configurations of the imaging unit 110, the image recognition unit 120, the storage unit 170, and the display unit 180 according to the first embodiment, the description thereof will be omitted. Hereinafter, the display control unit 130 according to the embodiment will be described focusing on differences from the display control unit 130 according to the first embodiment.

(Display Control Unit)

The display control unit 130 according to the embodiment controls display of the display unit 180 like the display control unit 130 according to the first embodiment.

For example, the display control unit 130 according to the embodiment causes the transmissive display unit 180 to display a display object on the basis of, for example, object information, 3-dimensional information of the real space supplied from the image recognition unit 120, or the like, like the display control unit 130 according to the first embodiment.

Since the acquisition of the information regarding the display object, the specifying of the position in the space, and the rendering process by the display control unit 130 according to the embodiment are similar to the foregoing respective processes by the display control unit 130 according to the first embodiment, the description thereof will be omitted herein.

Also, the display control unit 130 according to the embodiment performs a predetermined process on a display object so that the user can easily recognize occurrence or non-occurrence of cutting-off and display the display object subjected to the predetermined process in the display region of the display unit 180. Hereinafter, the predetermined process performed on the display object by the display control unit 130 will be described with reference to FIG. 7.

Figure 7:
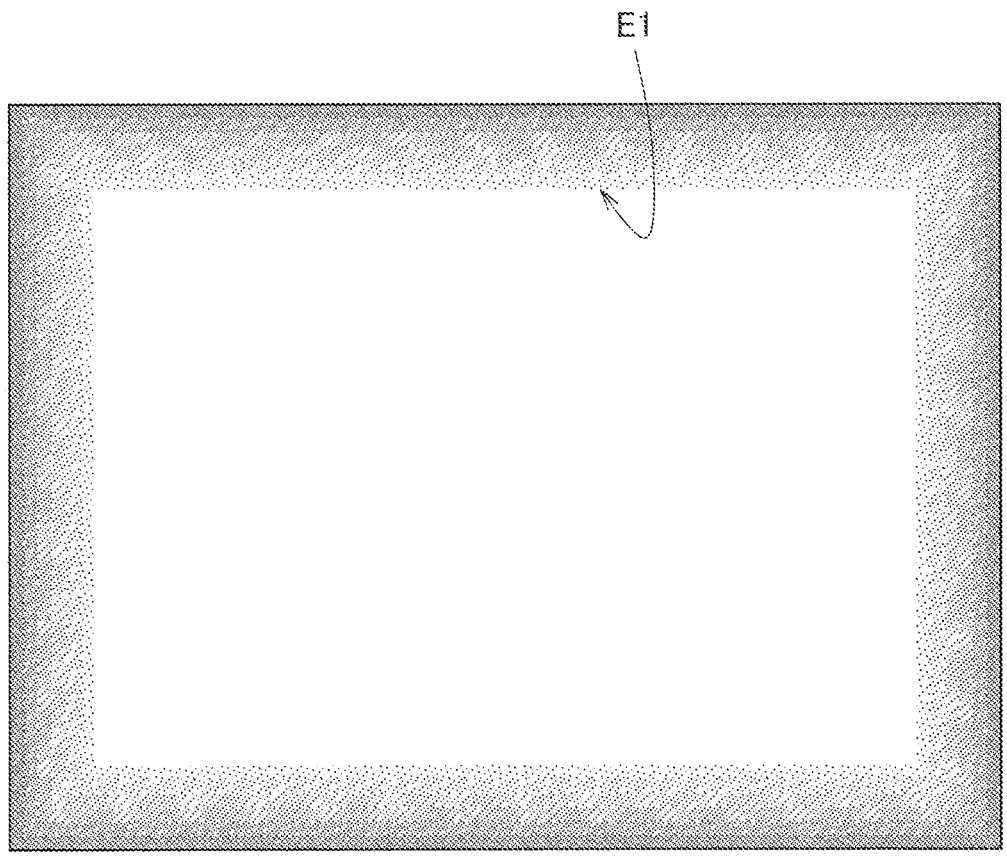
FIG. 7 is an explanatory diagram illustrating an example of a processing pattern used for the display control unit to perform a predetermined process on a display object according to a second embodiment of the present disclosure.

FIG. 7 is an explanatory diagram illustrating an example of a processing pattern used for the display control unit 130 to perform the predetermined process on the display object according to the embodiment. The display control unit 130 performs a process of applying a processing pattern illustrated in FIG. 7 to the display object to be displayed in the display region of the display unit 180. The processing pattern illustrated in FIG. 7 is a processing pattern used to perform a transmission process in which an alpha fading process is performed so that the display object is displayed at low transmittance in a region with high luminance and the display object is displayed at high transmittance in a region with low luminance.

A peripheral portion E1 illustrated in FIG. 7 is a peripheral portion of the display region of the display unit 180 in which display can be controlled by the display control unit 130. In a processing pattern illustrated in FIG. 7, the luminance decreases from the middle to outer edge of the peripheral portion E1. Accordingly, when the foregoing alpha fading process is performed by applying the processing pattern illustrated in FIG. 7, the display object is displayed so that transmittance increases (alpha-fades) from the middle to the outer edge in the peripheral portion E1.

Figure 8:
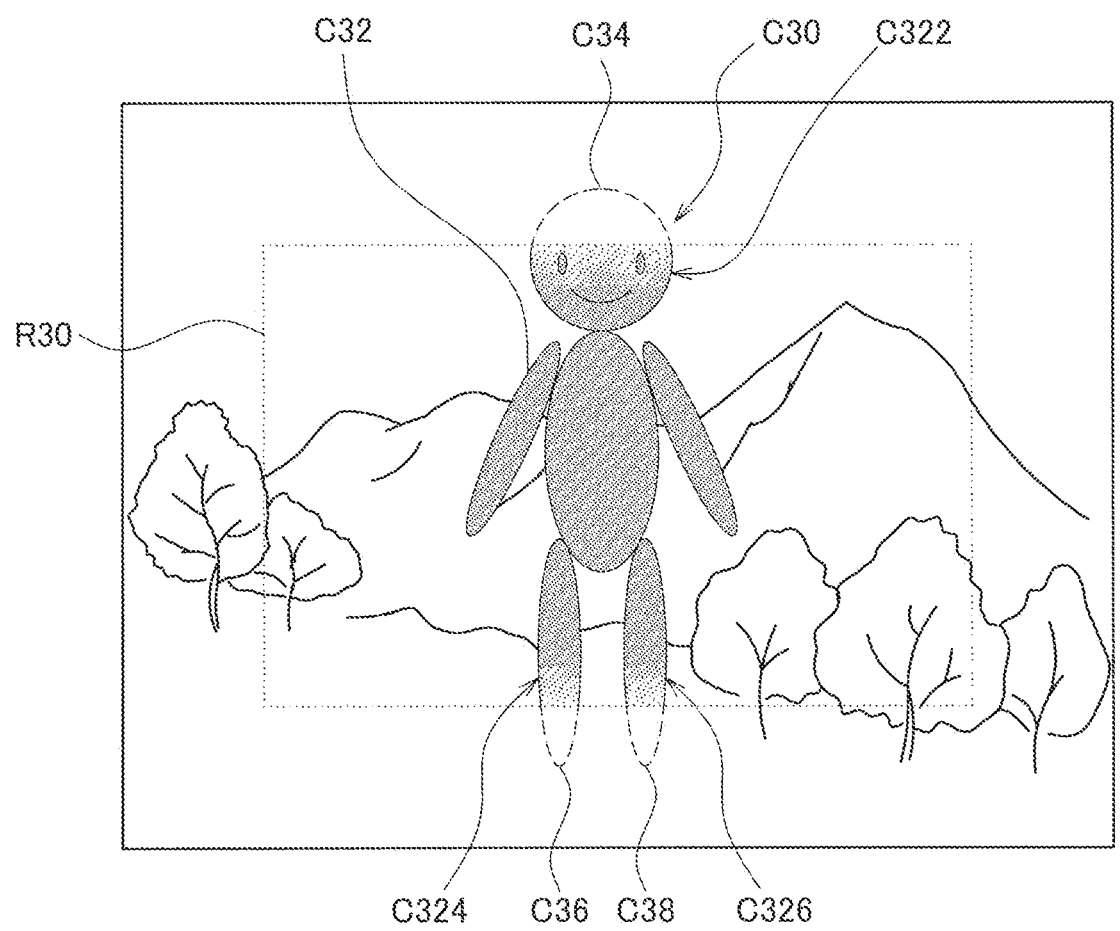
FIG. 8 is an explanatory diagram illustrating an example of the predetermined process performed on the display object by the display control unit according to the embodiment.

FIG. 8 is an explanatory diagram illustrating an example of the predetermined process performed on the display object by the display control unit 130 according to the embodiment. In FIG. 8, cutting-off also occurs and a display object C30 illustrated in FIG. 8 includes a visible region C32 and invisible regions C34, C36, and C38 like the example of the display object C10 described with reference to FIG. 2.

Since the display control unit 130 performs the transmission process by applying the processing pattern illustrated in FIG. 7 to the display object C30, semitransparent regions C322, C324, and C326 (peripheral regions) overlapping the periphery (peripheral portion) of the boundary R30 illustrated in FIG. 8 are alpha-faded to be displayed.

In this configuration, the user easily recognizes occurrence of cutting-off since the semitransparent regions C322, C324, and C326 are alpha-faded. Therefore, the user can understand that a whole of the display object C30 is not displayed and there is also information in a region other than the display region. Thus, the user is prevented from misunderstanding a meaning only in the visible region C32. Further, the user can easily understand a spot in which the display object is fragmented due to the cutting-off and the reason of the cutting-off (for example, the display size is considerably large at the current position of the user, or the like) because of the semitransparent regions C322, C324, and C326. Therefore, for example, the user can understand that the user can move to resolve the cutting-off.

The alpha fading process may be performed, for example, when a display object to be displayed by the display control unit 130 is specified and rendering is performed.

Note that the predetermined process performed by the display control unit 130 is not limited to the alpha fading process performed using the processing pattern of FIG. 7. For example, the display control unit 130 may perform the alpha fading process using the processing pattern with a circular shape or an elliptical shape (for example, a Gaussian distribution shape) for performing a process of increasing transmittance away from the middle of the processing pattern. Also, the display control unit 130 may help the user recognize occurrence of cutting-off by performing a process of causing a method of rendering the display object to be different in the peripheral portion of the display region. For example, the display control unit 130 may perform wire frame rendering in the peripheral portion of the display region and may perform polygon rendering in a region other than the peripheral portion.

<2-3. Operation of Second Embodiment>

Figure 9:
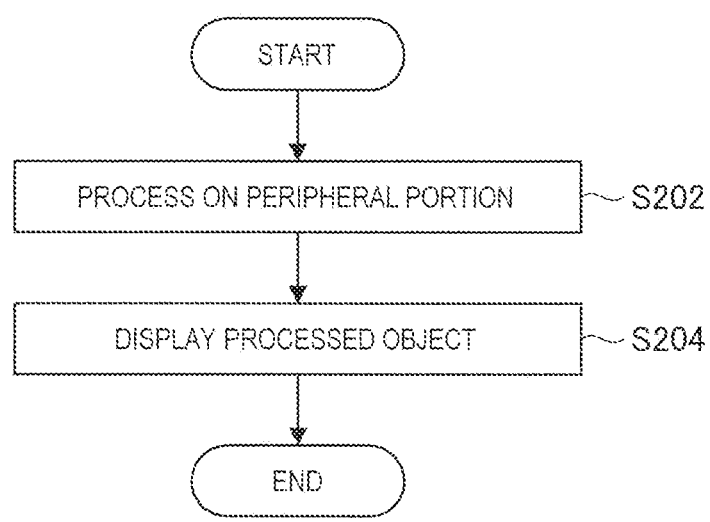
FIG. 9 is an explanatory diagram illustrating an example of an operation of an information processing device according to the embodiment.

The example of the configuration of the information processing device according to the second embodiment of the present disclosure has been described. Next, an example of an operation of the information processing device according to the embodiment will be described with reference to FIG. 9 particularly focusing on an operation of display control by the display control unit 130. FIG. 9 is a flowchart for describing an example of an operation of the information processing device according to the embodiment.

First, the display control unit 130 performs the alpha fading process on the peripheral portion of the display region using the processing pattern described with reference to FIG. 7 at the time of rendering of the display object (S202). Subsequently, the display control unit 130 causes the display unit 180 to display the display object subjected to the alpha fading process (S204).

Note that the above-described operation is exemplary and an operation related to the display control of the display control unit 130 according to the embodiment is not limited to the foregoing operation. For example, the display control unit 130 may cause display of a display object to be updated as required in accordance with a position or the like of the user in a current state by repeatedly performing the foregoing series of processes (steps S202 to S204).

<2-4. Advantageous Effects of Second Embodiment>

The second embodiment of the present disclosure has been described above. According to the embodiment, by performing the predetermined process on the display object, it is possible to help the user recognize whether cutting-off occurs, and thus to reduce a sense of discomfort of the user at the time of occurrence of the cutting-off. Also, when the user recognizes occurrence of cutting-off, the user can understand that a whole of the display object is not displayed and there is information in a region other the display region. Therefore, the user is prevented from misunderstanding a meaning only in a part of the display object displayed in the display region. Further, the user can easily understand a spot in which the display object is fragmented due to the cutting-off and the reason for the cutting-off (for example, the display size is considerably large at the current position of the user, or the like). Therefore, for example, the user can move or the like to see the information which is outside of the display region.

«3. Third Embodiment»

<3-1. Overview of Third Embodiment>

In the above-described first and second embodiments, the examples in which the process of helping the user recognize occurrence or non-occurrence of cutting-off (the display of the auxiliary UI or the predetermined process) is performed regardless of whether the cutting-off occurs have been described. On the other hand, an example in which a notification method for occurrence of cutting-off is decided on a basis of information regarding a user, information regarding a display object, information regarding an environment, or the like and an output of an auxiliary UI or a predetermined process is performed in a case in which occurrence of cutting-off is detected will be described in a third embodiment.

In an information processing device according to the third embodiment, by displaying the auxiliary UI or performing the predetermined process in a case in which occurrence of cutting-off is detected, it is possible to reduce a sense of discomfort of the user due to the occurrence of the cutting-off without hindering a sense of vision of the user in a case in which cutting-off does not occur. Hereinafter, a configuration and an operation of the third embodiment in which the foregoing advantageous effects are obtained will be sequentially described in detail.

<3-2. Configuration of Third Embodiment>

The information processing device according to the third embodiment of the present disclosure is a glasses type display device that includes a transmissive display unit like the information processing device according to the first embodiment described with reference to FIGS. 1 and 3. First, the outer appearance of the information processing device according to the embodiment is similar to the outer appearance of the information processing device 1 according to the first embodiment described with reference to FIG. 1. Also, since the information processing device according to the embodiment has a configuration similar to parts of the information processing device 1-1 according to the first embodiment and the information processing device according to the second embodiment, the description thereof will be omitted appropriately.

Figure 10:
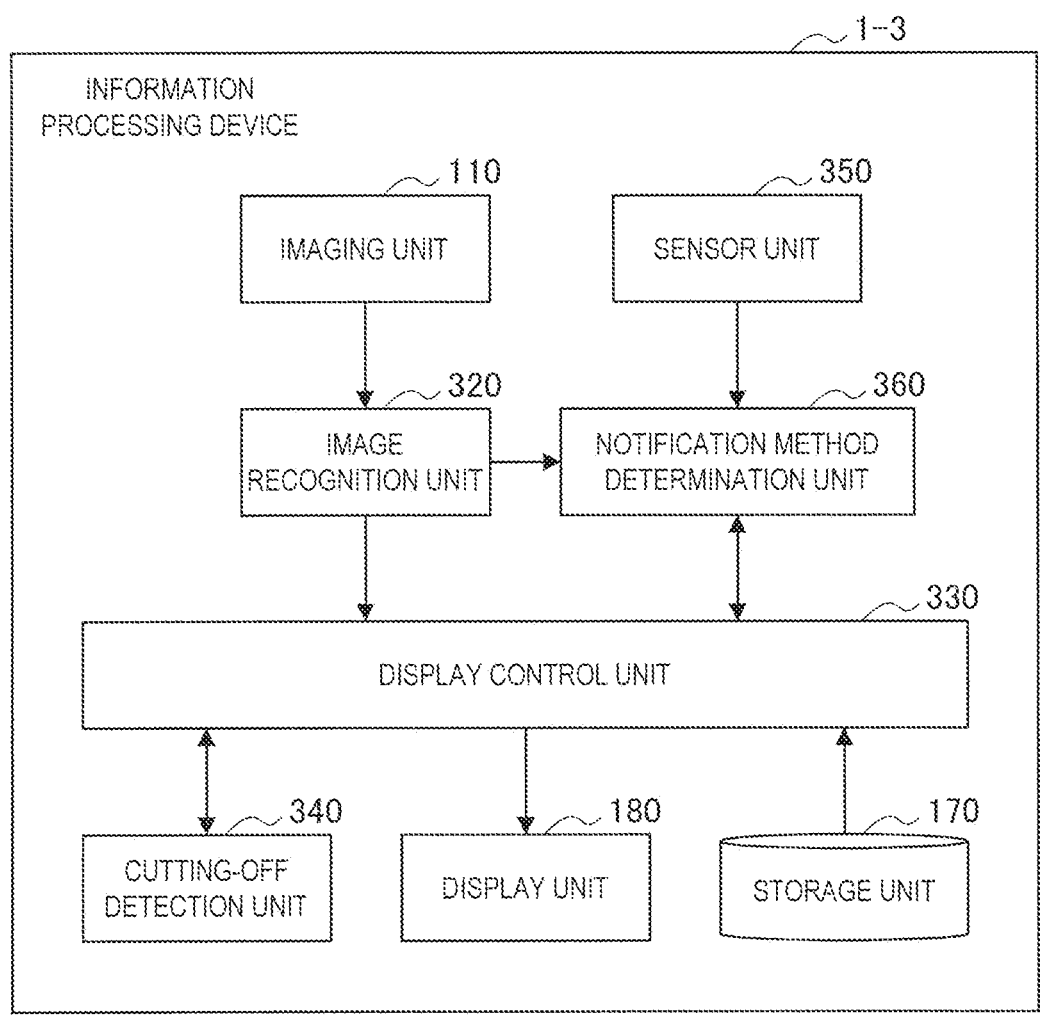
FIG. 10 is an explanatory diagram illustrating an example of a configuration of an information processing device according to a third embodiment.

FIG. 10 is an explanatory diagram illustrating an example of a configuration of an information processing device 1-3 according to the embodiment. As illustrated in FIG. 10, the information processing device 1-3 according to the embodiment includes the imaging unit 110, an image recognition unit 320, a display control unit 330, a cutting-off detection unit 340, a sensor unit 350, a notification method determination unit 360, the storage unit 170, and the display unit 180. Since the configurations of the imaging unit 110, the storage unit 170, and the display unit 180 according to the embodiment are substantially the same as the configurations of the imaging unit 110, the storage unit 170, and the display unit 180 according to the first embodiment, the description thereof will be omitted. Hereinafter, of the information processing device 1-3 according to the embodiment will be described focusing on a specific configuration according to the embodiment.

(Image Recognition Unit)

The image recognition unit 320 according to the embodiment analyzes a captured image acquired by the imaging unit 110 and recognizes a 3-dimensional shape of the real space or an object, a marker, or the like in the real space like the image recognition unit 120 described with reference to FIG. 3. Information regarding the 3-dimensional shape acquired by the image recognition unit 320 or information regarding an object or a marker in the real space is supplied to the display control unit 330 and the notification method determination unit 360.

(Display Control Unit)

The display control unit 330 according to the embodiment controls display of the transmissive display unit 180 like the display control unit 130 according to the first embodiment.

For example, the display control unit 130 according to the embodiment causes the transmissive display unit 180 to display a display object on the basis of, for example, object information, 3-dimensional information of the real space supplied from the image recognition unit 320, or the like the display control unit 130 according to the first embodiment.

Since the acquisition of the information regarding the display object, the specifying of the position in the space, and the rendering process by the display control unit 330 according to the embodiment are similar to the foregoing respective processes by the display control unit 130 according to the first embodiment, the description thereof will be omitted herein.

Figure 11A:
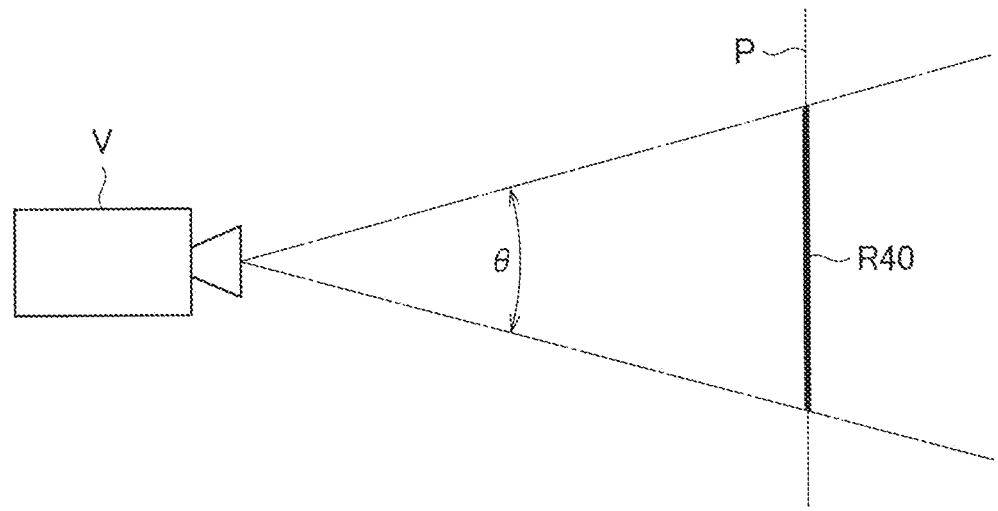
FIG. 11A is an explanatory diagram illustrating information regarding an angle of field supplied to a cutting-off detection unit by the display control unit according to the embodiment.
Figure 11B:
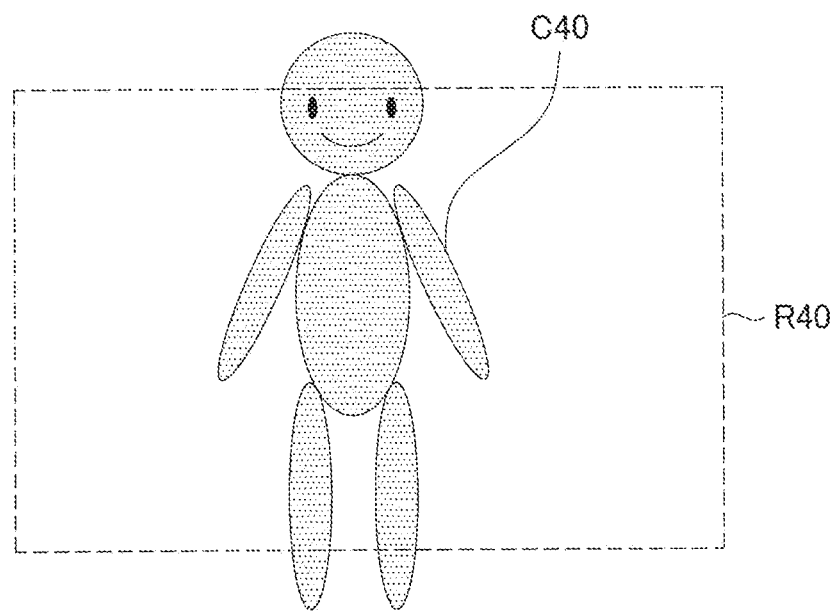
FIG. 11B is an explanatory diagram illustrating the information regarding the angle of field supplied to the cutting-off detection unit by the display control unit.

Also, the display control unit 330 supplies information regarding an angle of field in rendering of the display object to the cutting-off detection unit 340. FIGS. 11A and 11B are explanatory diagrams illustrating information regarding an angle of field supplied to the cutting-off detection unit 340 by the display control unit 330

An angle-of-field range R40 illustrated in FIG. 11A indicates a range in which a region equivalent to an angle of field θ is projected from a viewpoint V at which rendering is performed in a 3-dimensional space to a display surface P of the display object. Also, FIG. 11B illustrates a relation between the display object C40 and the angle-of-field range R40 on the display surface P. Information regarding the angle-of-field range R40 and the display object C40 is supplied from the display control unit 330 to the cutting-off detection unit 340. Note that the angle-of-field range R40 corresponds to a display region on the display unit 180.

Also, the display control unit 330 has a function of a notification control unit that causes the user to be notified of occurrence of cutting-off on the basis of detection of the occurrence of the cutting-off, in which a whole of the display object in which at least a partial region is displayed is not contained in the display region and which is performed by the cutting-off detection unit 340 to be described below.

For example, as the notification control unit, the display control unit 330 may cause the user to be notified of the occurrence of the cutting-off in a case in which the occurrence of the cutting-off is detected by the cutting-off detection unit 340 to be described below. In this configuration, in a case in which cutting-off does not occur, the user may not necessarily recognize the cutting-off. Therefore, a concern that a sense of vision or the like of the user is hindered is reduced.

Also, the display control unit 330 performs notification control in accordance with a disposition relation between the display object and the display region. An example of the notification control in accordance with the disposition relation between the display object and the display region will be described later.

Also, the display control unit 330 may cause the user to be notified of the occurrence of the cutting-off in accordance with a notification method decided by the notification method determination unit 360. Note that the decision of the notification method by the notification method determination unit 360 will be described later.

For example, the display control unit 330 may cause the user to be notified of the occurrence of the cutting-off by displaying the auxiliary UI (auxiliary information) on the display unit described in the first embodiment on the basis of the decision of the notification method by the notification method determination unit 360.

For example, as described in the first embodiment, the user may be notified of the auxiliary UI (auxiliary information) by displaying the frame in the peripheral portion of the display region. In this configuration, as described in the first embodiment, the user can feel just as the user peeps into a space in which the display object is displayed through the frame and can understand the occurrence of the cutting-off or the occurrence reason. Therefore, even in a case in which cutting-off occurs, a sense of discomfort is reduced.

Also, in the first embodiment, the example in which the occurrence of the cutting-off is not detected has been described. However, in the embodiment, since the occurrence of the cutting-off is detected, more various auxiliary UIs than in the first embodiment can be used on the basis of the detection of the occurrence of the cutting-off. Hereinafter, examples of the auxiliary UI displayed by the display control unit 330 and used to notify of occurrence of cutting-off in a case in which the occurrence of the cutting-off is detected will be described with reference to FIGS. 12 to 14.

Figure 12:
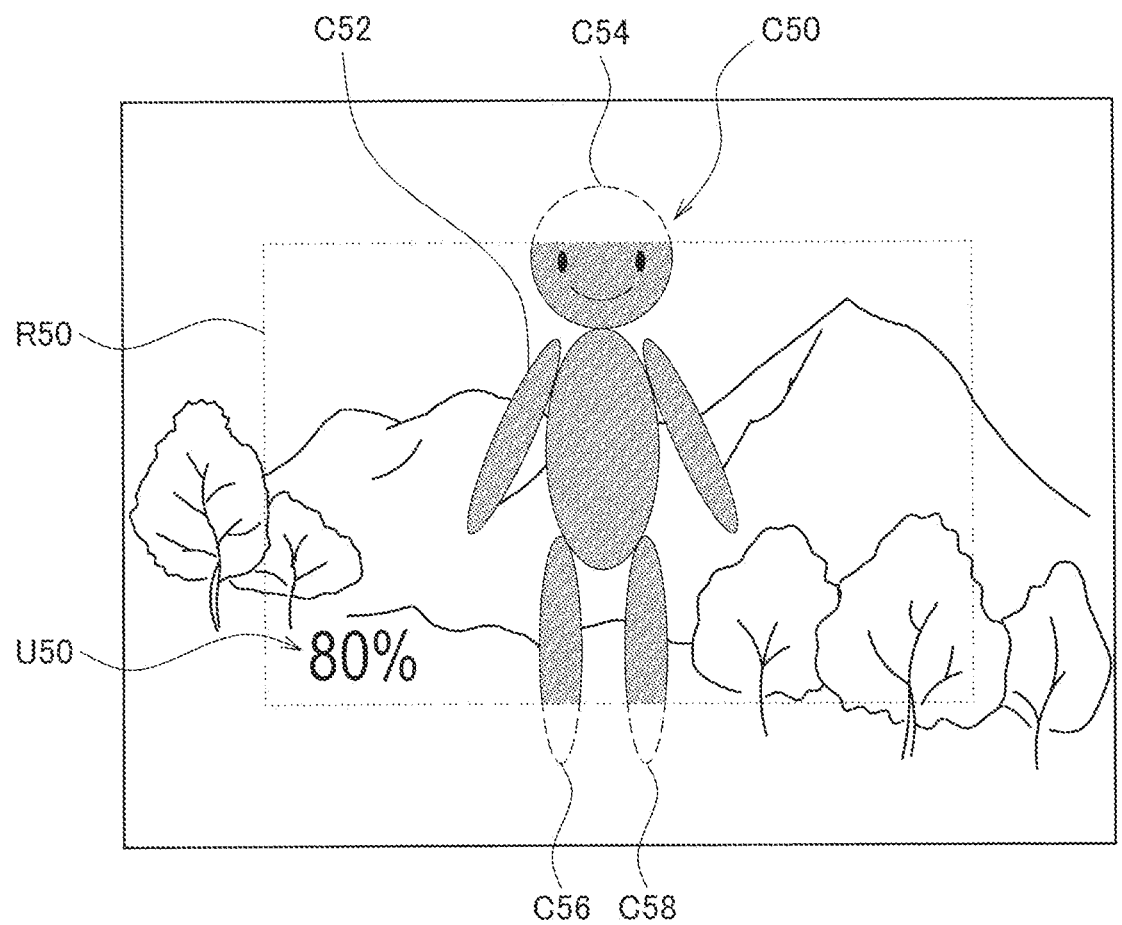
FIG. 12 is an explanatory diagram illustrating an example of an auxiliary UI displayed by the display control unit and used to notify of occurrence of cutting-off according to the embodiment.

FIG. 12 is an explanatory diagram illustrating an example of an auxiliary UI caused by the display control unit 330 to be displayed and used to notify of occurrence of cutting-off. Even in FIG. 12, cutting-off occurs and a display object C50 illustrated in FIG. 12 includes a visible region C52 which is displayed inside a boundary R50 and invisible regions C54, C56, and C58 which are not displayed inside the boundary R50, like the example of the display object C10 described with reference to FIG. 2.

A text display U50 illustrated in FIG. 12 is an auxiliary UI (auxiliary information) indicating an extent to which the display object C50 is contained in the display region (inside the boundary R50). That is, in the example of FIG. 12, the display control unit 330 demonstrates a function of the notification control unit and displays the text display U50 as information indicating the extent to which the display object is contained in the display region to cause the user to be notified of the text display U50. In this configuration, the user can understand how much the display object is contained in the display region.

Figure 13:
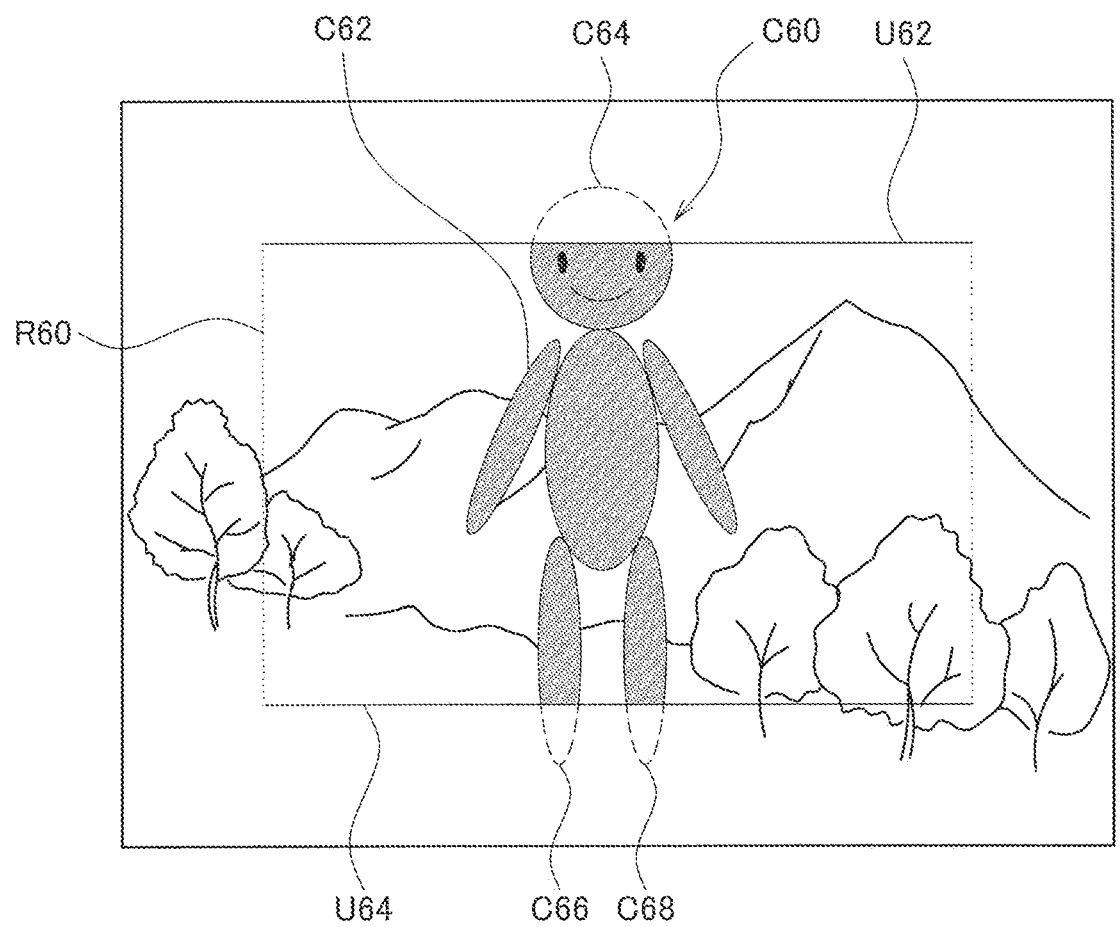
FIG. 13 is an explanatory diagram illustrating another example of an auxiliary UI displayed by the display control unit and used to notify of occurrence of cutting-off according to the embodiment.

FIG. 13 is an explanatory diagram illustrating another example of an auxiliary UI caused by the display control unit 330 to be displayed and used to notify of occurrence of cutting-off. Even in FIG. 13, cutting-off occurs and a display object C60 illustrated in FIG. 13 includes a visible region C62 which is displayed inside a boundary R60 of a display region and invisible regions C64, C66, and C68 which are not displayed inside the boundary R60, like the example of the display object C10 described with reference to FIG. 2.

Line segments U62 and U64 illustrated in FIG. 13 are an auxiliary UI indicating a side of the peripheral portion of the display region, the side on which cutting-off occurs in the display object C60. That is, in the example of FIG. 13, the user is notified of the auxiliary UI (auxiliary information) by displaying line segments on sides of the peripheral portion of the display region, the sides containing a region overlapping the display object. In this configuration, the user can more easily understand where the cutting-off occurs. Note that in the above-described example of FIG. 13, the line segments be displayed are different in accordance with a disposition relation between the display object and the display region. Therefore, in the above-described example of FIG. 13 is also an example of the notification control performed by the display control unit 330 in accordance with the disposition relation between the display object and the display region.

Figure 14:
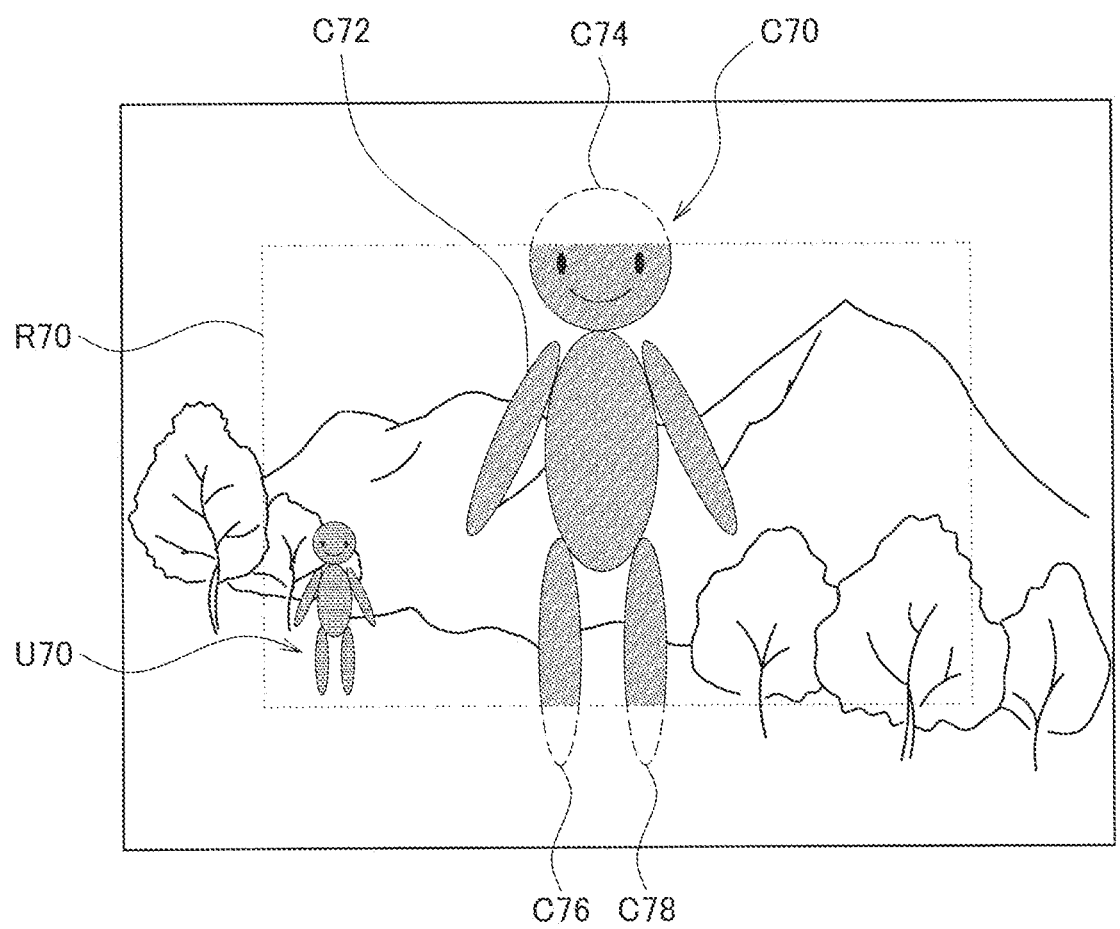
FIG. 14 is an explanatory diagram illustrating still another example of an auxiliary UI displayed by the display control unit and used to notify of occurrence of cutting-off according to the embodiment.

FIG. 14 is an explanatory diagram illustrating another example of an auxiliary UI caused by the display control unit 330 to be displayed and used to notify of occurrence of cutting-off. Even in FIG. 14, cutting-off occurs and a display object C70 illustrated in FIG. 14 includes a visible region C72 which is displayed inside a boundary R70 of a display region and invisible regions C74, C76, and C78 which are not displayed inside the boundary R70, like the example of the display object C10 described with reference to FIG. 2.

A contracted object U70 illustrated in FIG. 14 is an auxiliary UI (auxiliary information) indicating a whole of the display object C70 by contracting and displaying the display object C70 in the display region. In this configuration, the user can recognize occurrence of cutting-off and comprehend the overview of a whole of the display object even in a case in which the cutting-off occurs. Note that in a case in which the whole of the display object can be displayed without contracting the display object (for example, cutting-off occurs depending on a display position despite a display size falling in the display region), the uncontracted display object may be displayed as an auxiliary UI indicating the whole of the display object.

Note that in a case in which the occurrence of the cutting-off is detected, the auxiliary UI caused by the display control unit 330 to be displayed according to the embodiment and used to notify of occurrence of cutting-off is not limited to the foregoing example. For example, the display control unit 330 may display an auxiliary UI in which the whole of the display region or a region excluding a region in which the display object is displayed in the display region is lightly colored. Also, the display control unit 330 may combine and display the examples of the plurality of auxiliary UIs described above.

Also, the display control unit 330 may cause the user to be notified of occurrence of cutting-off by displaying a display object subjected to a predetermined process in the display region, as described in the second embodiment, on the basis of the decision of the notification method by the notification method determination unit 360.

The predetermined process may be performed on a peripheral region overlapping the peripheral portion of the display region in the display object, for example, as described in the second embodiment. For example, the predetermined process may be a process of changing transmittance (causing the transmittance to be different from other regions) in the peripheral region in the display object, as described in the second embodiment.

Note that the predetermined process performed by the display control unit 330 according to the embodiment is not limited to the foregoing example. For example, the predetermined process may be a process of changing at least one of a rendering method, a color, texture, transmittance, and a pattern in the peripheral region. Also, the predetermined process for the peripheral region may be a process of further reducing visibility of the peripheral region than visibility of the region of the display object other than the peripheral region by changing at least one of a rendering method, a color, texture, transmittance, and a pattern. In this configuration, the user can be caused to recognize occurrence of cutting-off and an occurrence spot at which the cutting-off occurs.

Also, the predetermined process may be a process of fading out the whole of the display object and not displaying the display object subsequently.

(Cutting-Off Detection Unit)

The cutting-off detection unit 340 illustrated in FIG. 10 detects occurrence of cutting-off on the basis of information regarding an angle of field supplied from the display control unit 330.

The cutting-off detection unit 340 according to the embodiment detects occurrence of cutting-off on the basis of the angle-of-field range R40 and the information regarding the display object C40 described with reference to FIG. 11B. For example, the cutting-off detection unit 340 may detect occurrence of cutting-off in a case in which the display object C40 does not fall in the angle-of-field range R40.

In a case in which occurrence of cutting-off is detected, the cutting-off detection unit 340 supplies the detection result (the detection of the occurrence of the cutting-off) to the display control unit 330.

(Sensor Unit)

The sensor unit 350 illustrated in FIG. 10 senses the user or an environment near the user to acquire information regarding the user and information regarding the environment. For example, the sensor unit 350 may include various sensors such as a microphone, a Global Positioning System (GPS) sensor, an acceleration sensor, a sense of vision (a visual line, a gazing point, a focal point, nictation, or the like) sensor, a biological information (a heart rate, a body temperature, a blood pressure, a brain wave, or the like) sensor, a gyro sensor, and an illumination sensor. Also, the sensor unit 350 supplies the acquired information regarding the user and information regarding the environment to the notification method determination unit 360.

(Notification Method Determination Unit)

The notification method determination unit 360 decides (determines) a notification method for occurrence of cutting-off. For example, the notification method determination unit 360 may decide (determine) the notification method for occurrence of cutting-off on the basis of information regarding the user, information regarding the display object, or information regarding an environment.

Here, the information regarding the user may include, for example, behavior information indicating a behavior of the user, motion information indicating a motion of the user, biological information, gazing information, and the like. The behavior information is, for example, information indicating a current behavior of the user during stopping, walking, running, driving an automobile, stepping stairs, or the like and may be recognized and acquired from sensor information or the like such as acceleration acquired by the sensor unit 350. Also, the motion information is information such as a movement speed, a movement direction, movement acceleration, or an approach to a position of content and may be recognized and acquired from sensor information or the like such as GPS data or acceleration acquired by the sensor unit 350. Also, the biological information is information such as a heart rate of the user, body temperature perspiration, a blood pressure, a pulse rate, respiration, nictation, an eye movement, or a brain wave and may be acquired by the sensor unit 350. Also, the gazing information is information regarding gazing of the user, such as a visual line, a point of gazing, a focal point, or convergence of both eyes and may be acquired by the sensor unit 350.

Also, the information regarding the display object may include, for example, information such as a display position of the display object, a position of the display object, color, animation characteristics, or an attribute of the display object. The display position may be a position at which the display object is displayed on the display unit 180. Also, the information regarding the color may be information regarding colors of the display object. Also, the information regarding the animation characteristics may be, for example, information such as a movement speed, a movement direction, a trajectory, or an updating frequency (a frequency of motions) of the display object. The information regarding the attribute of the display object may be, for example, information such as a kind of display object (text display, an image, a game character, an effect, or the like), importance, or priority. The above-described information regarding the display object may be stored in, for example, the storage unit 170 and may be supplied to the notification method determination unit 360 via the display control unit 330, or may be calculated by the display control unit 330 and may be supplied to the notification method determination unit 360.

Also, the information regarding the environment may include, for example, information such as a background, a peripheral situation, a place, illumination, an altitude, an atmospheric temperature, a wind direction, an air volume, and a time. Information regarding the background may be, for example, information such as a color (background color) of a background in the real space or the like, a kind of information in the background, or importance, may be acquired by the imaging unit 110, or may be recognized and acquired by the image recognition unit 320. Also, information regarding the peripheral situation may be information indicating whether a person other than the user or an automobile is in the periphery, may be information such as the degree of congestion or the like, or may be recognized and acquired by the image recognition unit 320. Also, information regarding the place may be, for example, information indicating characteristics of a place where the user is located or the like, such as an indoor, outdoor, underwater, or hazard place or may be information indicating a meaning of the place for the user, such as a house, a company, a familiar place, or a place in which the user visits for the first time. The information regarding the place may be acquired by the sensor unit 350 or may be recognized and acquired by the image recognition unit 320. Also, information regarding illumination, an altitude, an atmospheric temperature, a wind direction, an air volume, and a time (for example, a GPS time) may be acquired by the sensor unit 350.

Hereinafter, the decision of the notification method by the notification method determination unit 360 on the basis of the information regarding the user, the information regarding the display object, or the information regarding the environment described above will be described giving several examples.

For example, in a case in which a display object is a display object which is superimposed and displayed on an object in the real space so that a real object looks like another object, there is a concern of the original purpose (the real object looks like another object) not being achieved when a predetermined process (alpha fading or the like) is performed on the display object. Accordingly, the notification method determination unit 360 may decide display of an auxiliary UI as a notification method on the basis of information indicating that the display object is a display object which is superimposed and displayed on an object in the real space.

Also, in a case in which occurrence of cutting-off is clearly expressed to the user, the notification method determination unit 360 may decide display of an auxiliary UI as a notification method.

For example, in a case in which a display object is text display, there is a concern of the user recognizing erroneous information unless the user is caused to recognize occurrence of cutting-off. Accordingly, the notification method determination unit 360 may decide display of an auxiliary UI as a notification method on the basis of information regarding an attribute of a display object in which the display object is the text display.

Also, even in a case in which a display object is displayed in accordance with the size of an object in the real space, there is a concern of the user not recognizing that the display object is displayed in accordance with the size of the object in the real space unless the user is caused to recognize that cutting-off occurs. Accordingly, the notification method determination unit 360 may decide display of an auxiliary UI as a notification method on the basis of information regarding the foregoing display object and the information regarding the real space (the information regarding the environment).

Also, even in a case in which a visual line of the user is to be guided to a region other than the display region, it is preferable to cause the user to be explicitly notified of occurrence of cutting-off. Accordingly, the notification method determination unit 360 may decide display of an auxiliary UI as a notification method on the basis of biological information or the gazing information regarding the user, the information regarding the environment, or the like in a case in which the visual line of the user can be determined to be guided to the region other than the display region.

Also, in a case in which a focal point of the user is not formed on a display object (out of focus) or the user does not gaze a display object, it is preferable to suggest occurrence of cutting-off without hindering a sense of vision of the user. Accordingly, the notification method determination unit 360 may decide a predetermined process as a notification method on the basis of the gazing information regarding the user.

Also, similarly even in a case in which a motion of the user or a movement of a visual line is large, it is preferable to suggest occurrence of cutting-off without hindering a sense of vision of the user. Accordingly, the notification method determination unit 360 may decide a predetermined process as a notification method on the basis of a motion (acceleration or the like) or the gazing information regarding the user.

Also, in a case in which a display object is an object for presenting a view of the world (presenting ambience), discontinuous display or blurred contour display can be permitted in some cases. Accordingly, the notification method determination unit 360 may decide a predetermined process as a notification method on the basis of the information regarding the attribute of the display object in a case in which the display object is the foregoing object.

Also, in a case in which a display object is an object for performing list display, tile-form display, or the like, a function or a meaning is not damaged even when an alpha-fading process or the like is performed on a boundary in some cases. Accordingly, the notification method determination unit 360 may decide a predetermined process as a notification method on the basis of the information regarding the attribute of the display object in a case in which the display object is the foregoing object.

The examples of the decision of the notification method by the notification method determination unit 360 have been described, but the decision of the notification method by the notification method determination unit 360 is not limited to the foregoing examples. The notification method may be decided in accordance with various methods by combining, for example, the information regarding the user, the information regarding the display object, the information regarding the environment described above, and the like.

<3-3. Operation of Third Embodiment>

Figure 15:
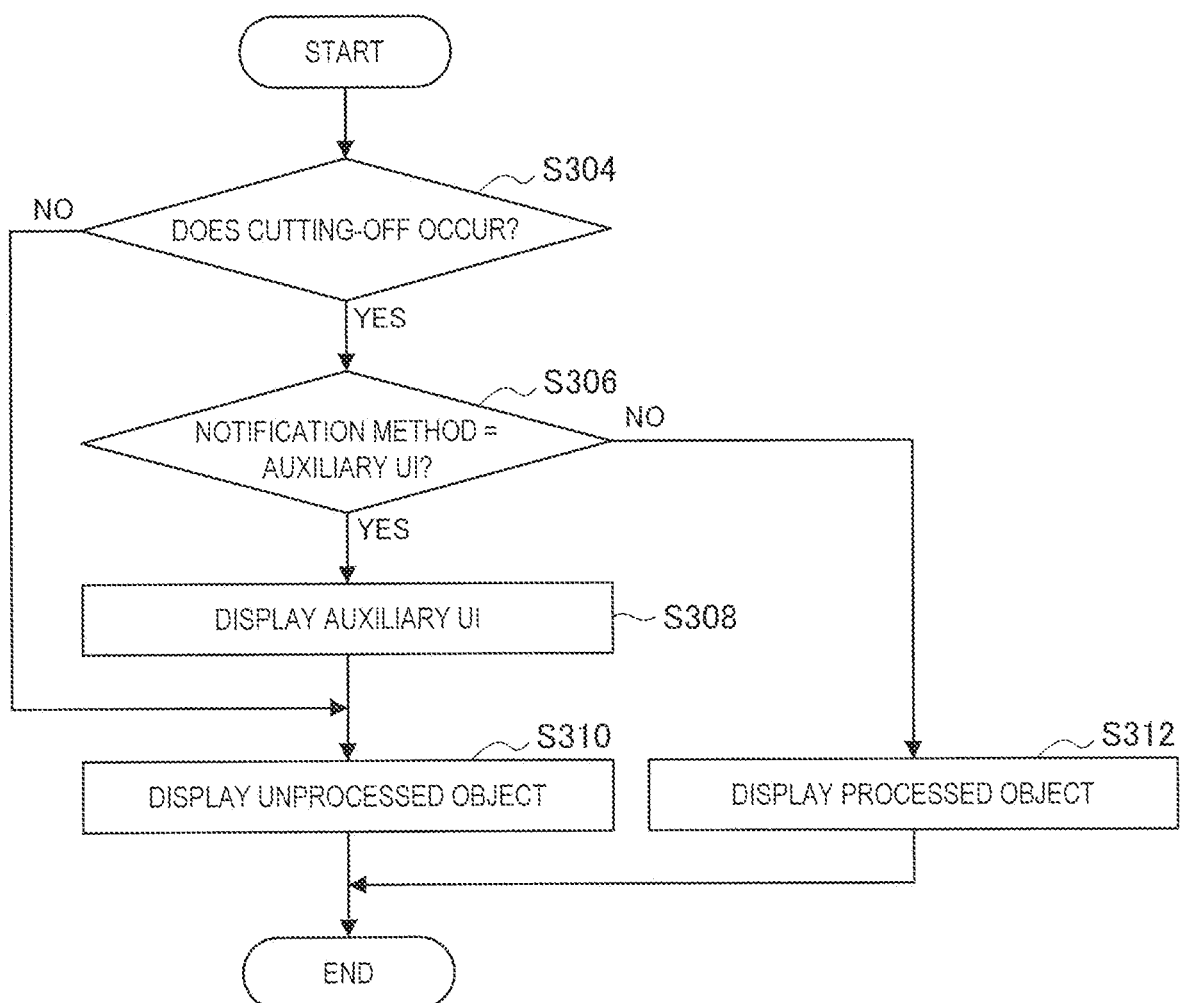
FIG. 15 is an explanatory diagram illustrating an example of an operation of the information processing device according to the embodiment.

The example of the configuration of the information processing device according to the third embodiment of the present disclosure has been described. Next, an example of an operation of the information processing device according to the embodiment will be described with reference to FIG. 17 particularly focusing on an operation related to display control by the display control unit 330, the cutting-off detection unit 340, the notification method determination unit 360, and the like. FIG. 15 is a flowchart for describing an example of the operation of the information processing device according to the embodiment.

First, the cutting-off detection unit 340 detects occurrence of cutting-off on the basis of the information regarding the angle of field supplied from the display control unit 330 (S304). In a case in which the occurrence of the cutting-off is not detected (NO in S304), a display object not subjected to the predetermined process is displayed (S310).

Conversely, in a case in which the occurrence of the cutting-off is detected (YES in S304), the notification method determination unit 360 decides the notification method (S306). In a case in which the notification method determination unit 360 decides the display of the auxiliary UI as the notification method (YES in S306), the display control unit 330 causes the display unit 180 to display the auxiliary UI and the display object not subjected to the predetermined process (S308 and S310).

Conversely, in a case in which the notification method determination unit 360 decides the predetermined process as the notification method (NO in S306), the display control unit 330 performs a predetermined process on the display control unit and causes the display unit 180 to display the display object subjected to the predetermined process (S312).

Note that the above-described operation is exemplary and the operation related to the display control of the display control unit 330 according to the embodiment is not limited to the foregoing operation. For example, the display control unit 330 may frequently update the display of the display object in accordance with a position or the like of the user in the current state by repeatedly performing the foregoing series of processes (steps S304 to S312).

<3-4. Modification Examples of Third Embodiment>

The third embodiment of the present disclosure has been described above. Hereinafter, several modification examples of the embodiment will be described. Note that each modification example to be described below may be applied singly to the embodiment or may be applied in combination to the embodiment. Also, each modification example may be applied instead of the configuration described in the embodiment or may be additionally applied to the configuration described in the embodiment.

(Modification Example 1)

In the foregoing embodiment, the example in which the auxiliary UI (auxiliary information) used to notify occurrence of cutting-off is displayed on the display unit 180 by the display control unit 330 to notify the user has been described, but the embodiment is not limited to this example.

For example, the auxiliary UI may not be displayed on the display unit 180, but may be output by vibration, illumination (light emission of LED or the like), a sound, or the like. For example, the information processing device according to the embodiment may further include an output unit that outputs at least one of the vibration, the illumination, and the sound. Also, the information processing device according to the embodiment may further include a notification control unit that causes the user to be notified of occurrence of cutting-off in accordance with a method including at least one of the vibration, the illumination, and the sound.

In this configuration, it is possible to notify the user of occurrence of cutting-off without changing display of the display unit 180.

(Modification Example 2)

In the foregoing embodiment, the example in which the cutting-off detection unit 340 detects occurrence of cutting-off on the basis of whether a display object falls in the angle-of-field range has been described, but the embodiment is not limited to this example.

For example, in a case in which a partial region of a predetermined region of a display object is not contained in the display region, the cutting-off detection unit may detect the occurrence of the cutting-off. In this case, the display control unit 330 may demonstrate the function of the notification control unit and notify the user of the occurrence of the cutting-off.

Figure 16:
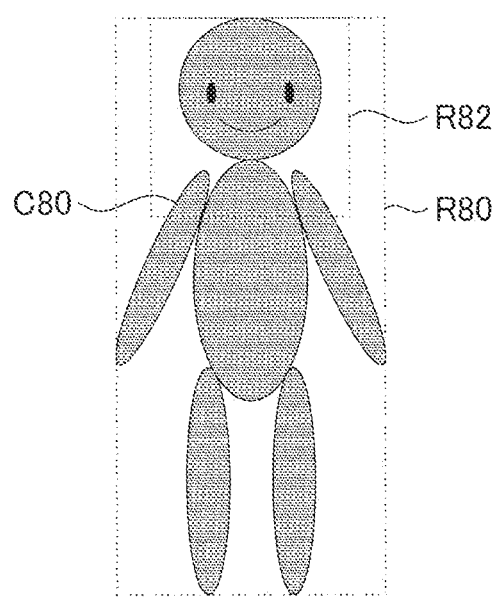
FIG. 16 is an explanatory diagram illustrating a modification example of the embodiment.

FIG. 16 is an explanatory diagram illustrating detection of occurrence of cutting-off according to the modification example. To display a whole of the display object C80 illustrated in FIG. 16, for example, an angle-of-field range necessarily includes a whole of the display object C80 like a region R80. However, in a case in which the angle-of-field range includes a whole of the preset region R82, the cutting-off detection unit according to the modification example may not detect occurrence of cutting-off despite a case in which the angle-of-field does not include a whole of the display object C80. Also, the cutting-off detection unit according to the modification example may detect occurrence of cutting-off in a case in which the region R82 falls in the angle-of-field range. For example, the predetermined region R82 may be set so that the region R82 contains an important region of the display object C80. In this configuration, occurrence of cutting-off is detected only in a case in which the cutting-off occurs in the important region in the display object.

<3-5. Advantageous Effects of Third Embodiment>

The second embodiment of the present disclosure has been described above. According to the embodiment, in a case in which occurrence of cutting-off is detected, the auxiliary UI is displayed or the predetermined process is performed, and thus it is possible to reduce a sense of discomfort of the user due to the occurrence of the cutting-off without hindering a sense of vision of the user in a case in which no cutting-off occurs. Also, when the user recognizes occurrence of cutting-off, the user can understand that the whole of the display object is not displayed and there is information in a region other the display region. Therefore, the user is prevented from misunderstanding a meaning only in a part of the display object displayed in the display region. Further, the user can easily understand a spot in which the display object is fragmented due to the cutting-off and the reason for the cutting-off (for example, the display size is considerably large at the current position of the user, or the like). Therefore, for example, the user can move or the like to see the information which is outside of the display region.

«4. Hardware Configuration Example»

Heretofore, each embodiment of the present disclosure has been described. Information processing such as the display control process (the notification control process), the cutting-off occurrence detection process, and the notification method determination process described above is realized through the cooperation of software, and the hardware of the information processing device 1 described below.

Figure 17:
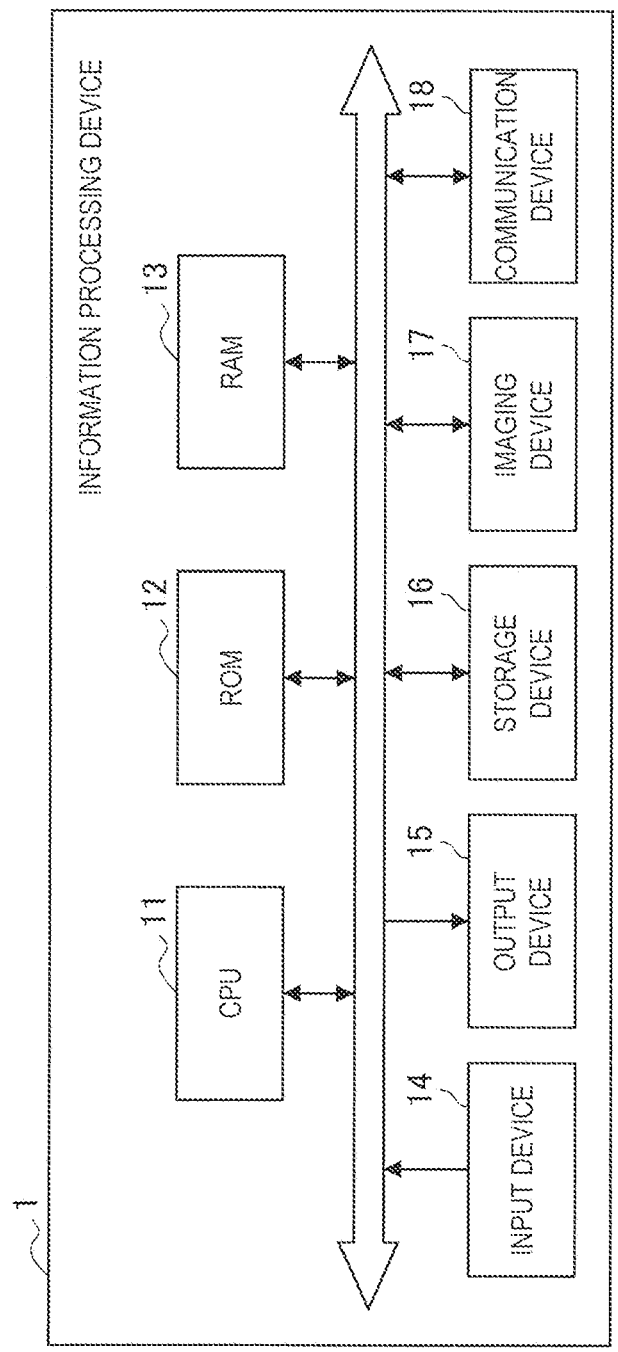
FIG. 17 is an explanatory diagram illustrating an example of a hardware configuration of an information processing device according to the present disclosure.

FIG. 17 is an explanatory diagram illustrating an example of a hardware configuration of the information processing device 1. As shown in FIG. 17, the information processing device 1 includes a central processing unit (CPU) 11, a read only memory (ROM) 12, a random access memory (RAM) 13, an input device 14, an output device 15, a storage device 16, an imaging device 17, and a communication device 18.

The CPU 11 functions as an operation processing device and a control device, and controls the overall operation in the information processing device 1 in accordance with various programs. The CPU 11 may also be a microprocessor. The ROM 12 stores programs, operation parameters and the like used by the CPU 11. The RAM 13 temporarily stores programs used in the execution by the CPU 11, parameters that change appropriately in that execution, and the like. These are connected together by a host bus including a CPU bus or the like. The functions of the image recognition units 120 and 320, the display control units 130 and 330, the cutting-off detection unit 340, the notification method determination unit 360, the notification control unit, and the like according to Modification Example 1 of the third embodiment are realized mainly through software working in cooperation with the CPU 11, the ROM 12, and the RAM 13.

The input device 14 includes inputting means such as a mouse, a keyboard, a touch panel, a button, a microphone, a switch, and a lever, for the user to input information, an input control circuit that generates an input signal on the basis of input by the user, and outputs the generated input signal to the CPU 11, and the like. The user of the information processing device 1 is able to input various kinds of data and direct processing operations with respect to the information processing device 1, by operating the input device 14.

The output device 15 includes a display device such as a liquid crystal display (LCD) device, an OLED device, and a lamp, for example. Furthermore, the output device 15 includes a voice output device such as a speaker and headphones. For example, the display device displays a captured image, a generated image or the like. On the other hand, the voice output device converts voice data and the like into voice, and then outputs the voice. The output device 15 corresponds to the display unit 180 described with reference to FIG. 3 and the output unit according to the modified example 1 of the third embodiment.

The storage device 16 is a device for storing data. The storage device 16 may include a storage medium, a recording device that stores data in a storage medium, a readout device that reads out data from a storage medium, a deletion device that deletes data recorded in a storage medium, and the like. The storage device 16 stores programs executed by the CPU 11 and various kinds of data. The storage device 16 corresponds to the storage unit 170 described with reference to FIG. 3.

The imaging device 17 includes an imaging optical system such as a shooting lens which collects light and a zoom lens, and a signal conversion device such as a charge coupled device (CCD) and a complementary metal oxide semiconductor (CMOS). The imaging optical system collects light emitted from a subject to form a subject image at a signal converting unit, and the signal conversion device converts the formed subject image into an electrical image signal. The imaging device 17 corresponds to the imaging unit 110 described with reference to FIG. 3.

The communication device 18 is a communication interface including a communication device for connecting to the communication network, or the like, for example. Also, the communication device 18 may be a wireless local area network (LAN) compatible communication device, a long term evolution (LTE) compliant communication device, a wired communication device that performs communication via a wire, or a Bluetooth communication device.

«5. Conclusion»

As described above, according to each embodiment of the present disclosure, it is possible to reduce a sense of discomfort of a user due to occurrence of cutting-off.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing embodiment, the example in which a display object is displayed on a glasses type display device has been described, but the present technology is not limited to this example. For example, the present technology may be applied to a transmissive head-up display that displays an image on a windshield of an automobile or the like or the present technology may be applied to a transmissive or installed display device.

Also, in the foregoing embodiment, the example in which the information processing device performing the display control (notification control) includes the display unit has been described, but the present technology is not limited to this example. For example, the information processing device performing the display control (notification control) and a display device including the display unit may be different devices.

Also, in the foregoing embodiment, the example in which the information processing device performing the display control (notification control) includes the imaging unit, the image recognition unit, the storage unit, and the like has been described, but the present technology is not limited to this example. For example, the information processing device performing the display control (notification control) may receive information regarding a display object or the like or a captured image or an image recognition result from another device directly or via a network or the like and may perform display control (display control).

Also, in the foregoing third embodiment, the example in which the user is notified of occurrence of cutting-off in accordance with either the output of the auxiliary UI or the predetermined process (the alpha fading process or the like on the peripheral portion) has been described, but the present technology is not limited to this example. For example, the user may be notified of occurrence of cutting-off by combining both the output of the auxiliary UI and the predetermined process (the alpha fading process or the like on the peripheral portion).

Also, the respective steps in the embodiment described above do not necessarily have to be performed chronologically in the order illustrated in the flowchart. For example, the respective steps in the process of the embodiment described above may also be performed in a different order than the order illustrated in the flowchart, or they may be performed in parallel.

Also, a computer program for causing the hardware such as the CPU, ROM, RAM and the like built in the information processing device 1 to demonstrate the function of the information processing device 1 described above can also be created. Also, a storage medium that has the computer program stored therein is also provided. Also, the number of computers executing the computer program is not particularly limited. For example, the computer program may be executed in cooperation by a plurality of computers (for example, a plurality of servers or the like). Note that a single computer or a plurality of computers in cooperation is referred to as a "computer system."

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a notification control unit configured to cause a user to be notified of occurrence of cutting-off in a display region of a transmissive display unit on a basis of detection of the occurrence of the cutting-off in which a whole of a display object in which at least a partial region is displayed is not contained in the display region.

(2)
The information processing device according to (1), in which, in a case in which the occurrence of the cutting-off is detected, the notification control unit causes the user to be notified of the occurrence of the cutting-off.

(3)
The information processing device according to (1) or (2), in which the notification control unit performs notification control in accordance with a positional relation between the display object and the display region.

(4)
The information processing device according to any one of (1) to (3), in which the user is notified of the occurrence of the cutting-off by causing the display unit to display auxiliary information.

(5)
The information processing device according to (4), in which the user is notified of the auxiliary information by displaying a frame in a peripheral portion of the display region.

(6)
The information processing device according to (4), in which the user is notified of the auxiliary information by displaying a line segment in a side of a peripheral portion of the display region, the side containing a region overlapping the display object.

(7)
The information processing device according to (4), in which the auxiliary information indicates a whole of the display object.

(8)
The information processing device according to (4), in which the auxiliary information is information indicating an extent to which the display object is contained in the display region.

(9)
The information processing device according to any one of (1) to (8), in which the user is notified of the occurrence of the cutting-off by displaying the display object subjected to a predetermined process in the display region.

(10)
The information processing device according to (9), in which the predetermined process is performed on a peripheral region overlapping a peripheral portion of the display region in the display object.

(11)
The information processing device according to (10), in which the predetermined process is a process of changing at least one of a rendering method, a color, lightness, and transmittance in the peripheral region.

(12)
The information processing device according to (9), in which the predetermined process includes fading out the display object.

(13)
The information processing device according to any one of (1) to (12), in which the user is notified of the occurrence of the cutting-off in accordance with a method including at least one of vibration, lighting, and sound.

(14)
The information processing device according to any one of (1) to (13), in which the notification control unit causes the user to be notified of the occurrence of the cutting-off in a case in which a partial region in a predetermined region of the display object is not contained in the display region.

(15)
The information processing device according to any one of (1) to (14), further including:
a notification method determination unit configured to determine a notification method for the occurrence of the cutting-off on a basis of at least one of information regarding the user, information regarding the display object, and information regarding an environment.

(16)
The information processing device according to (15), in which the information regarding the user includes at least one of behavior information indicating a behavior of the user, motion information indicating a motion of the user, biological information, and gazing information.

(17)
The information processing device according to (15) or (16), in which the information regarding the display object includes at least one of a display position, a color, and an attribute of the display object.

(18)
The information processing device according to any one of (15) to (17), in which the information regarding the environment includes at least one of a background, illumination, and a place.

(19)
An information processing method including:
causing, by a processor, a user to be notified of occurrence of cutting-off in a display region of a transmissive display unit on a basis of detection of the occurrence of the cutting-off in which a whole of a display object in which at least a partial region is displayed is not contained in the display region.

(20)

A program causing a computer system to realize:

a notification control function of causing a user to be notified of occurrence of cutting-off in a display region of a transmissive display unit on a basis of detection of the occurrence of the cutting-off in which a whole of a display object in which at least a partial region is displayed is not contained in the display region.

REFERENCE SIGNS LIST 1 information processing device
110 imaging unit
120 image recognition unit
130 display control unit
170 storage unit
180 display unit
182 spatial light modulation unit
184 collimating optical system
185A, 185B display region
186 light-guiding plate
320 image recognition unit
330 display control unit
340 cutting-off detection unit
350 sensor unit
360 notification method determination unit

The invention claimed is:

1. An information processing device, comprising:
at least one processor configured to:
control an optical see-through display to display a virtual object to correspond to a real space based on at least one of three-dimensional information (3D) of the real space or object information of the real space, wherein
the optical-see-through display has a display region and a non-display region that each have optical transparency, and
the display region is surrounded by the non-display region; and
control the optical see-through display to modify display at an edge of the display region adjacent to the virtual object based on a condition that the virtual object is arranged, on the optical see-through display, at a boundary between the display region and the non-display region.

2. The information processing device according to claim 1, wherein the at least one processor is further configured to control the optical see-through display to modify the display at the edge of the display region by a display of a frame in a peripheral portion of the display region.

3. The information processing device according to claim 1, wherein the at least one processor is further configured to control the optical see-through display to modify the display at the edge of the display region by a display of a line segment at the edge of the display region.

4. The information processing device according to claim 1, wherein the at least one processor is further configured to control the optical see-through display to display a whole of the virtual object within the display region based on the condition that the virtual object is arranged at the boundary between the display region and the non-display region.

5. The information processing device according to claim 1, wherein the at least one processor is further configured to control the optical see-through display to display an auxiliary object indicating an extent to which the virtual object is contained in the display region based on the condition that the virtual object is arranged at the boundary between the display region and the non-display region.

6. The information processing device according to claim 1, wherein the at least one processor is further configured to control the optical see-through display to modify the display at the edge of the display region by a partial change in at least one of a rendering method of the virtual object, a color of the virtual object, lightness of the virtual object, or transmittance of the virtual object.

7. The information processing device according to claim 1, wherein the at least one processor is further configured to control the optical see-through display to modify the display at the edge of the display region by fade out of a whole of the display object.

8. The information processing device according to claim 1, wherein the at least one processor is further configured to control an output device, which is different from the optical see-through display, to output at least one of vibration, lighting, or sound based on the condition that the virtual object is arranged at the boundary between the display region and the non-display region.

9. The information processing device according to claim 1, wherein the at least one processor is further configured to determine a position of the virtual object in the real space based on a position of a user of the optical see-through display defined in a three-dimensional coordinate system.

10. The information processing device according to claim 1, wherein the optical see-through display includes a light-guiding plate and a holographic optical element.

11. An information processing method, comprising:
controlling an optical see-through display to display a virtual object to correspond to a real space based on at least one of three-dimensional information (3D) of the real space or object information of the real space, wherein
the optical-see-through display has a display region and a non-display region that each have optical transparency, and
the display region is surrounded by the non-display region; and
controlling the optical see-through display to modify display at an edge of the display region adjacent to the virtual object based on a condition that the virtual object is arranged, on the optical see-through display, at a boundary between the display region and the non-display region.

12. A non-transitory computer-readable medium having stored thereon, computer-executable instructions that, when executed by a computer, cause the computer to execute operations, the operations comprising:
controlling an optical see-through display to display a virtual object to correspond to a real space based on at least one of three-dimensional information (3D) of the real space or object information of the real space, wherein
the optical-see-through display has a display region and a non-display region that each have optical transparency, and
the display region is surrounded by the non-display region; and
controlling the optical see-through display to modify display at an edge of the display region adjacent to the virtual object based on a condition that the virtual object is arranged, on the optical see-through display, at a boundary between the display region and the non-display region.

\* \* \* \* \*